US012799381B2

(12) United States Patent
Couchot et al.

(10) Patent No.: US 12,799,381 B2
(45) Date of Patent: Nov. 17, 2026

(54) DROP-IN RECYCLED REFRIGERANT COMPOSITIONS HAVING REDUCED NET GWP BEING A DROP-IN REPLACEMENT FOR R-134a AND R-1234yf

(71) Applicant: The Coulan Company, L.L.C., Clayton, NC (US)

(72) Inventors: David L. Couchot, Mason, OH (US); Abiral Mainali, Raleigh, NC (US); Raymond E. Maloney, Clayton, NC (US)

(73) Assignee: The Coulan Company, L.L.C., Clayton, NC (US)

( * ) Notice: Subject to any disclaimer, the term of this patent is extended or adjusted under 35 U.S.C. 154(b) by 42 days.

(21) Appl. No.: 18/738,207

(22) Filed: Jun. 10, 2024

(65) Prior Publication Data

US 2025/0223482 A1 Jul. 10, 2025

Related U.S. Application Data

(63) Continuation of application No. 18/541,224, filed on Dec. 15, 2023.

(51) Int. Cl.
*C09K 5/04* (2006.01)

(52) U.S. Cl.
CPC ........ *C09K 5/045* (2013.01); *C09K 2205/126* (2013.01); *C09K 2205/22* (2013.01); *C09K 2205/40* (2013.01)

(58) Field of Classification Search
CPC .............. C09K 5/045; C09K 2205/126; C09K 2205/22; C09K 2205/40
See application file for complete search history.

(56) References Cited

U.S. PATENT DOCUMENTS 11,028,300 B1 6/2021 Couchot et al.
11,208,583 B1 12/2021 Couchot et al.
11,655,707 B2 5/2023 Couchot et al.
2006/0243945 A1 11/2006 Minor et al.
2012/0126187 A1* 5/2012 Low .................... C11D 7/5009 521/146
2013/0200294 A1 8/2013 Carr et al.
2014/0222699 A1 8/2014 Low
2023/0404724 A1 12/2023 Couchot et al.

* cited by examiner

*Primary Examiner* — Angela C Brown-Pettigrew
*Assistant Examiner* — Jiajia Janie Cai
(74) *Attorney, Agent, or Firm* — Robert Goozner

(57) ABSTRACT

A refrigerant composition includes about 56-60 wt % 1,1,1,2-tetrafluoroethane; about 0.1-1 wt % pentafluoroethane; about 3-7 wt % difluoromethane; and about 35-38 wt % 1,3,3,3-tetrafluoropropene, where the composition is zeotropic. The composition has a 91:9 wt % ratio of difluoromethane to pentaflouromethane, which are recycled materials having a net gwp of 0. The 1,3,3,3-tetrafluoropropene also has gwp of about 0. A method of preparing the 91:9 wt % refrigerant mixture includes injecting a mixture of recovered refrigerants into the center of a distillation column, the mixture of injected refrigerants being difluoromethane, pentafluoroethane and chlorodifluoromethane, removing from the top of the distillation column a refrigerant composition of about 90-92 wt % difluoromethane and about 8-10 wt % pentafluoroethane, and removing chlorodifluoromethane from a bottom of the distillation column.

15 Claims, 21 Drawing Sheets

| ODS Refrigerant Reclamation Totals by Year (pounds) | | | | | | | | | | | |
|---|---|---|---|---|---|---|---|---|---|---|---|
| | CFC-11 | CFC-12 | CFC-13 | CFC-113 | CFC-114 | R-502 | HCFC-22 | HCFC-123 | HCFC-124 | R-500 | R-503 | Total |
| 2000 | 1,548,734 | 1,679,526 | 1,978 | 229,954 | 182,544 | 619,579 | 7,094,995 | 250,811 | - | 245,530 | - | 11,853,651 |
| 2001 | 1,182,130 | 1,296,745 | 1,485 | 162,572 | 100,581 | 249,604 | 4,320,103 | 212,568 | - | 188,981 | - | 7,714,769 |
| 2002 | 1,411,133 | 1,237,060 | 343 | 143,404 | 288,084 | 330,170 | 4,915,809 | 179,481 | - | 184,104 | 8,591 | 8,698,179 |
| 2003 | 903,731 | 623,245 | - | 110,425 | 394,091 | 90,749 | 4,356,619 | 110,022 | - | 90,344 | - | 6,679,226 |
| 2004 | 1,188,360 | 720,181 | - | 129,134 | 281,958 | 105,536 | 7,231,013 | 250,842 | - | 137,300 | - | 10,044,324 |
| 2005 | 985,184 | 593,345 | - | 107,985 | 70,086 | 55,181 | 6,172,133 | 319,539 | - | 74,278 | - | 8,377,731 |
| 2006 | 1,188,230 | 738,482 | - | 133,511 | 48,824 | 113,879 | 8,535,423 | 318,241 | - | 96,668 | - | 11,173,258 |
| 2007 | 891,687 | 460,594 | 1,389 | 162,773 | 26,400 | 75,431 | 8,191,322 | 227,323 | - | 41,518 | - | 10,078,437 |
| 2008 | 989,234 | 476,726 | - | 175,568 | 310,321 | 88,040 | 10,045,071 | 272,583 | - | 195,724 | 60 | 12,553,327 |
| 2009 | 1,026,824 | 212,638 | 224 | 135,301 | 16,554 | 136,936 | 7,544,327 | 436,463 | - | 118,847 | 46 | 9,628,160 |
| 2010 | 713,747 | 350,139 | 212 | 170,130 | 77,161 | 27,522 | 7,907,536 | 316,595 | 270 | 107,808 | 13 | 9,671,133 |
| 2011 | 719,036 | 291,869 | 68 | 151,887 | 327,537 | 41,448 | 8,290,406 | 335,760 | 74 | 43,430 | 30 | 10,201,545 |
| 2012 | 784,061 | 328,582 | 357 | 306,157 | 39,797 | 30,748 | 9,401,446 | 316,340 | 439 | 108,221 | 148 | 11,316,296 |
| 2013 | 736,126 | 372,521 | 185 | 36,166 | 415,399 | 15,689 | 8,701,264 | 445,854 | 1,088 | 48,616 | 395 | 10,773,303 |
| 2014 | 812,357 | 406,436 | 849 | 22,293 | 18,238 | 24,587 | 7,823,982 | 374,357 | 3,611 | 42,453 | 108 | 9,529,271 |
| 2015 | 740,543 | 288,302 | 118 | 217,007 | 6,370 | 15,771 | 7,811,832 | 399,683 | 199 | 33,171 | 32 | 9,513,028 |
| 2016 | 574,826 | 155,254 | 155 | 30,710 | 182,121 | 15,719 | 9,408,329 | 415,516 | 4,251 | 16,842 | 30 | 10,803,753 |
| 2017 | 905,045 | 263,957 | 1,292 | 86,361 | 10,461 | 27,206 | 8,680,022 | 592,256 | 396 | 32,665 | 184 | 10,599,845 |
| 2018 | 565,158 | 191,711 | 521 | 25,757 | 4,067 | 28,767 | 8,041,474 | 535,673 | 1,059 | 51,366 | 103 | 9,445,656 |
| 2019 | 486,525 | 152,386 | 338 | 54,990 | 13,790 | 43,786 | 7,821,260 | 581,941 | 10,378 | 30,893 | 23 | 9,196,310 |
| 2020 | 452,920 | 79,428 | 63 | 33,597 | 25,117 | 8,951 | 7,204,095 | 575,887 | 1,745 | 8,254 | 234 | 8,390,291 |

Note: Other CFCs and HCFCs that are reported in small quantities (e.g., CFC-115 and HCFC-142b) or that are contained in blends with non-ODS (e.g., R-408A) are excluded.

FIG. 9

| HFC Refrigerant Reclamation Totals by Year (pounds) | | | | | | | | | |
|---|---|---|---|---|---|---|---|---|---|
| | HFC-23 | HFC-134a | HFC-227ea | HFC-404A | HFC-407A | HFC-407C | HFC-410A | Other HFCs | Total |
| 2017 | 1,175 | 1,858,132 | 154,655 | 486,719 | 111,255 | 167,445 | 2,103,404 | 207,481 | 5,090,266 |
| 2018 | 841 | 1,910,240 | 248,178 | 506,639 | 143,254 | 167,248 | 2,043,667 | 230,242 | 5,250,309 |
| 2019 | 642 | 2,399,952 | 1,810 | 485,338 | 105,435 | 213,668 | 2,596,861 | 256,034 | 6,059,740 |
| 2020 | 2,293 | 1,992,632 | 134 | 482,131 | 87,162 | 322,112 | 2,406,556 | 203,603 | 5,496,623 |

| Mixed Refrigerant Received Totals by Year (pounds) | | | | | | | | | | |
|---|---|---|---|---|---|---|---|---|---|---|
| 2010 | 2011 | 2012 | 2013 | 2014 | 2015 | 2016 | 2017 | 2018 | 2019 | 2020 |
| 77,038 | 121,718 | 86,146 | 93,807 | 113,883 | 221,159 | 924,475 | 375,671 | 975,271 | 774,472 | 907,371 |

Note: Mixed refrigerant is material received by reclaimers that contains multiple refrigerants, including ODS and HFCs, potentially in unknown quantities and composition.

These are not blends, which contain specific constituents at specific ratios. Mixed refrigerant totals are included in the Total Refrigerant Received table below.

| Total Refrigerant Received Totals by Year (pounds) | | | | | | | | | | |
|---|---|---|---|---|---|---|---|---|---|---|
| 2010 | 2011 | 2012 | 2013 | 2014 | 2015 | 2016 | 2017 | 2018 | 2019 | 2020 |
| 9,236,800 | 9,128,744 | 10,517,549 | 12,244,890 | 10,240,184 | 11,880,944 | 16,156,981 | 17,373,256 | 18,067,745 | 18,445,030 | 15,811,914 |

Note: Reclaimers were not required to include HFC refrigerants in reports of total amount received until 2017.

FIG. 9A

DROP-IN RECYCLED REFRIGERANT COMPOSITIONS HAVING REDUCED NET GWP BEING A DROP-IN REPLACEMENT FOR R-134a AND R-1234yf

This application is a continuation-in-part of U.S. application Ser. No. 18/541,224, filed Dec. 15, 2023, the entire contents of which are hereby incorporated by reference.

FIELD OF DISCLOSURE

The present disclosure generally relates to environmentally friendly recycled refrigerant compositions that include tetrafluoroethane, pentafluoroethane, difluoromethane, and tetrafluoropropene, which are a drop-in replacement for R-134a and R-1234yf.

BACKGROUND

There is a great need for technologies or applications for mitigation or adaptation against climate change. This technology relates to the decarbonization of the atmosphere through effective means of reusing and repurposing legacy high Global Warming Potential (GWP) refrigerants that can replace virgin refrigerants in installed and new refrigerant applications.

As the industrial revolution moved from the nineteenth to the twentieth century, there was a shift from primarily mechanical, steam-driven technologies to technologies that derived energy from electricity and fossil fuels. The adoption of electricity sparked rapid development in refrigeration technologies that utilized fluorinated and chlorinated hydrocarbon refrigerants used in refrigeration, air conditioning, and heating equipment. Refrigerants used during the twentieth century were ozone-depleting substances (ODS) with high global warming potential (GWP). While burning fossil fuels undoubtedly released abundant amounts of carbon dioxide into the atmosphere, refrigerants vented to the atmosphere played a significant role in accelerating the global warming crisis heading into the twenty-first century. Consequently, there is a great need for innovative technology to control, reduce, and prevent anthropogenic emissions of greenhouse gases so we can reduce carbon pollution and manage the global warming crisis impacting our planet today.

Refrigeration and air conditioning equipment frequently employ refrigerants to remove heat from a conditioned space. A refrigerant is a fluid that absorbs heat at a low temperature and pressure and rejects heat at a higher temperature and pressure. It usually involves changes of the state of the fluid.

Since the 1930s, R-12 ($CCl_2F_2$) and R-22 (1950's—$CHClF_2$) have been used as refrigerants in refrigeration and air conditioning equipment. R-12 is a chlorofluorocarbon (CFC) refrigerant and R-22 is a hydrochlorofluorocarbon (HCFC) refrigerant. When released into the atmosphere, CFC and HCFC refrigerants are known to deplete the Earth's protective ozone layer and contribute to global warming. The United States signed the Montreal Protocol on Substances that Deplete the Ozone Layer (Montreal Protocol) in 1987 to establish a phase-out schedule that would ban the production and import of R-12 in 1996 and R-22 in 2020.

R-134a, also known as 1,1,1,2-tetrafluoroethane, is a hydrofluorocarbon (HFC) refrigerant widely used in various applications, including air conditioning and refrigeration. Its history dates back to the late 1980s and early 1990s when efforts were made to develop an alternative refrigerant to replace chlorofluorocarbons (CFCs) and hydrochlorofluorocarbons (HCFCs) due to their harmful impact on the ozone layer. It is a preferred refrigerant for automotive air conditioning.

However, R134a is a high global warming potential (GWP) refrigerant and is a perfluoroalkyl and polyfluoroalkyl substance (PFAS). PFAS are a group of synthetic chemicals that are very persistent in the environment and can have harmful health effects. R-134a has a GWP of 1,430, which means that it is 1,430 times more potent than carbon dioxide at trapping heat in the atmosphere.

Atmospheric observations of most currently measured HFCs confirm their abundances are increasing at accelerating rates. Total emissions of HFCs increased by 19 percent from 2016 to 2020 and the four most abundant HFCs in the atmosphere, in GWP-weighted terms, are HFC-134a, HFC-125, HFC-23, and HFC-143a.

In 2020, HFCs excluding HFC-23 accounted for a radiative forcing of 0.037 $W/m^2$. This is an increase of nearly a third in total HFC forcing relative to 2016. This radiative forcing was projected to increase by an order of magnitude to 0.25 $W/m^2$ by 2050. Full implementation of the Kigali Amendment is expected to reduce the future radiative forcing due to HFCs (excluding HFC-23) to 0.13 $W/m^2$ in 2050, which is a reduction of about 50 percent compared with the radiative forcing projected in the business-as-usual scenario of uncontrolled HFCs.

As a result, R-134a is being phased out in many countries. In the United States, it will be banned from use in new refrigeration and air conditioning equipment starting in 2025.

Accordingly, there is a need for new technologies that will reduce or eliminate the utilization of R-134a in refrigeration systems.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, an embodiment of the disclosure relates to a refrigerant composition that includes R-125 (pentafluoroethane), R-32 (difluoromethane), R-134a (1,1,1,2-tetrafluoroethane), and R-1234ze(E) (1,3,3,3-tetrafluoropropene) with properties that permit utilization as a drop-in replacement for R-134a in new and installed equipment. The refrigerant composition may have a global warming potential (GWP) of less than 1.

In one embodiment, the refrigerant composition is formed from 56-60 wt % 1,1,1,2-tetrafluoroethane; about 0.1-1 wt % pentafluoroethane; about 3-7 wt % difluoromethane; and about 35-38 wt % 1,3,3,3-tetrafluoropropene, where the composition is zeotropic, and the composition is a drop-in refrigerant replacement for 1,1,1,2-tetrafluoroethane. The difluoromethane and the 1,1,1,2-tetrafluoroethane are a distilled fraction of reclaimed refrigerants, with the distilled fraction containing about $2\times10^{-15}$ wt % hydrocarbons and about $2\times10^{-25}$ wt % water, and the refrigerant is a drop-in replacement for 2,3,3,3-tetrafluoropropene. The refrigerant can also include about 0.1-5 wt % $CO_2$.

In the disclosure, the zeotropic composition can be about 58 wt % 1,1,1,2-tetrafluoroethane; about 0.5 wt % pentafluoroethane; about 5 wt % difluoromethane; and about 36.5 wt % 1,3,3,3-tetrafluoropropene. The liquid phase enthalpy can be about 0.23 kJ/g at 70° F., and a vapor phase enthalpy of about 0.41 kJ/g at 70° F., The liquid phase entropy can be about $6.1\times10^{-4}$ kJ/gR at 70° F., and the vapor phase entropy can be about $9.5\times10^{-4}$ kJ/gR at 70° F.

A refrigerant mixture of the disclosure can be formed from about 95-99.99 wt % of the refrigerant composition of the disclosure and about 0.01-5 wt % lubricant for a total of 100 wt % of refrigerant composition and lubricant. The lubricant can be mineral oil, alkylbenzene oil, polyalkylene glycol or polyol ester. The lubricant can be a polyalkylene glycol or an ester of at least one neopentyl polyol represented by the structural formula:

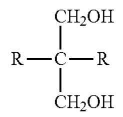

in which each R is independently selected from $CH_3$, $C_2H_5$ or $CH_2OH$.

In another embodiment, the refrigerant mixture can further include at least one of a UV dye or a sealant.

In another embodiment, a method of preparing a refrigerant composition includes injecting a mixture of reclaimed refrigerants into a center of a distillation column, the mixture of reclaimed refrigerants formed from difluoromethane, pentafluoroethane, chlorodifluoromethane and 1,1,1,2 tetrafluoroethane, removing from the top of the distillation column a zeotropic refrigerant composition of difluoromethane and pentafluoroethane, and removing a bottom fraction from the bottom of the distillation column, the bottom fraction comprising 1,1,1,2 tetrafluoroethane & chlorodifluoromethane.

In the method, the top fraction can be about 91 wt % difluoromethane, and about 9 wt % pentafluoroethane. The bottom fraction can be distilled to obtain a bottom product that is greater than 97 wt % 1,1,1,2-tetrafluoroethane.

In the method, the top fraction and the bottom product are combined with 1,3,3,3-tetrafluoropropene to yield a refrigerant composition including about 56-60 wt % 1,1,1,2-tetrafluoroethane; about 0.1-1 wt % pentafluoroethane; about 3-7 wt % difluoromethane; and about 35-38 wt % 1,3,3,3-tetrafluoropropene, wherein the composition is zeotropic and has a net global warming potential of less than 1.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 1 depicts the liquid phase pressure-temperature curve of the refrigerant compositions of the disclosure compared to R-134a;

FIG. 2 depicts the vapor-phase pressure-temperature curve of the refrigerant compositions of the disclosure compared to R-134a;

FIG. 3 depicts the liquid density-temperature curve of the refrigerant compositions of the disclosure compared to R-134a;

FIG. 4 depicts the vapor density-temperature curve of the refrigerant compositions of the disclosure compared to R-134a;

FIG. 5 depicts the liquid phase enthalpy versus temperature curve of the refrigerant compositions of the disclosure compared to R-134a;

FIG. 6 depicts the vapor phase enthalpy versus temperature curve of the refrigerant compositions of the disclosure compared to R-134a;

FIG. 7 depicts the liquid phase entropy versus temperature curve of the refrigerant compositions of the disclosure compared to R-134a;

FIG. 8 depicts the vapor phase entropy versus temperature curve of the refrigerant compositions of the disclosure compared to R-134a;

FIG. 9 shows the ODS refrigerant reclamation totals by year;

FIG. 9A shows HFC refrigerant reclamation totals by year, mixed refrigerant received totals by year and total refrigerant received totals by year;

DETAILED DESCRIPTION

Figure 1:
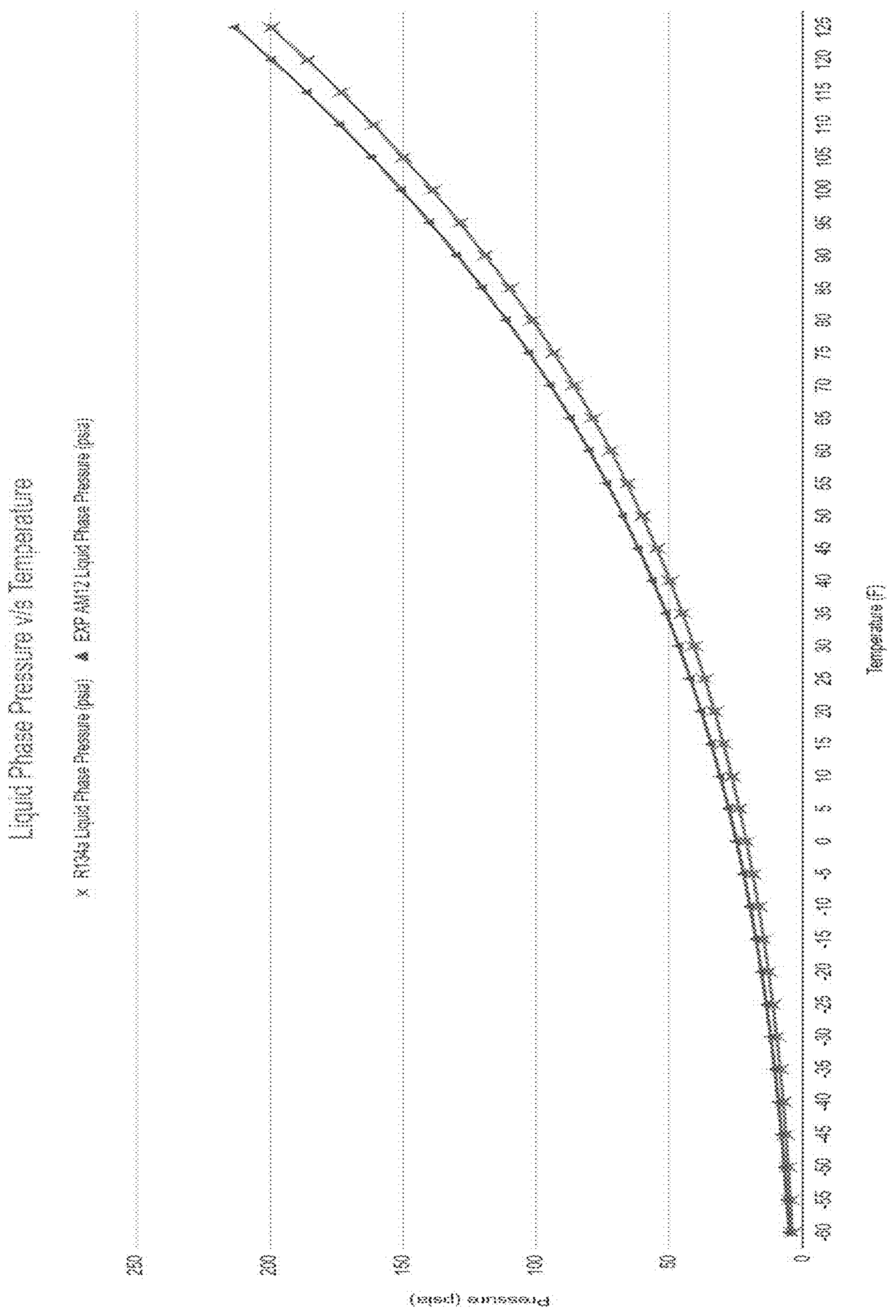

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

The disclosure relates to a zeotropic refrigerant mixture distilled from recovered refrigerants that is a drop-in replacement for R-134a or R-1234yf and has a distillation component with a new GWP of zero. A typical mixture of recovered HFC refrigerants coming back to refrigerant reclamation facilities can be introduced to a distillation process to produce an HFC blend that will work as a replacement of R-134a or R-1234yf with equivalent levels of performance, reduced flammability characteristics, and net-zero GWP.

The nomenclature of the materials used in the disclosure is set forth in Table. 1.

TABLE 1

Description of Refrigerant Materials

| Chemical Name | Formula | Designation |
|---|---|---|
| 1,1,1,2-tetrafluoroethane | $CF_3CH_2F$ | R-134a |
| pentafluoroethane | $CF_3CHF_2$ | R-125 |
| difluoromethane | $CH_2F_2$ | R-32 |
| chlorodifluoromethane | $CHClF_2$ | R-22 |
| 1,1,1-trifluoroethane | $CF_3CH_3$ | R-143a |
| 2,3,3,3-tetrafluoropropene | $H_2C{=}CFCF_3$ | R-1234yf |
| 1,3,3,3-tetrafluoropropene | $CF_3CH{=}CHF$ | R-1234ze(E) |
| 50:50 R-32:R-125* | | R-410A |
| 68.9:31.1 R-32:1234yf* | | R-454B |
| Hydrocarbon | $CH_3(CH_2)_nCH_3$ | HC |

*Proportions in wt %.

There are many blends in the U.S. that contain R-134a, including R-407C, R-407A, R-438A, R-422B3, R-422D, R-421A, and R-427A. Many of these blends were developed as drop-in replacements for R-22, but over the years, many technicians illegally mixed them with R-22. This created a crisis in which highly mixed ozone-depleting substances (ODS) and hydrofluorocarbon (HFC) materials exist. Millions of pounds of this material exist with varying percentages of R-134a.

R-134a, also known as 1,1,1,2-tetrafluoroethane, is a hydrofluorocarbon (HFC) refrigerant widely used in various applications, including air conditioning and refrigeration. Its history dates back to the late 1980s and early 1990s when efforts were made to develop an alternative refrigerant to replace chlorofluorocarbons (CFCs) and hydrochlorofluorocarbons (HCFCs) due to their harmful impact on the ozone layer.

As a result, R-134a is being phased out in many countries. In the United States, it will be banned from use in new refrigeration and air conditioning equipment starting in 2025.

A brief history of R-134a starts in the 1980s, when scientists and environmentalists raised concerns about the depletion of the ozone layer caused by CFCs and HCFCs, commonly used as refrigerants. In response to these concerns, the search for alternative refrigerants began, focusing on substances that were less harmful to the ozone layer. DuPont, an American chemical company, developed R134a as a non-ozone-depleting refrigerant with low toxicity and excellent thermodynamic properties.

R-134a gained popularity as a replacement for CFC-12 (also known as R-12), which was widely used in automotive air conditioning systems. The automotive industry began adopting R-134a in the early 1990s due to its compatibility with existing equipment and its relatively low impact on the environment. R-134a offered comparable cooling performance to R12 while being more environmentally friendly.

However, there are still environmental considerations associated with R-134a. R-134a is classified as a greenhouse gas and has a relatively high global warming potential (GWP) compared to other refrigerants. Although R-134a does not contribute to ozone depletion, its high GWP became a concern as scientists focused on reducing greenhouse gas emissions. Efforts were made to develop alternative refrigerants with lower GWPs, such as hydrofluoroolefins (HFOs) like R-1234yf, which has a GWP of 2.

The regulatory environment includes The Montreal Protocol, an international treaty signed in 1987, aimed to protect the ozone layer by phasing out the production and use of ozone-depleting substances. In some countries, regulations were introduced to restrict the use of R134a in new automotive air conditioning systems, favoring the adoption of lower-GWP refrigerants like R-1234yf. However, R-134a continues to be widely used in various stationary air conditioning and refrigeration applications.

As environmental concerns persist including PFAS, the search for more sustainable refrigerants is ongoing. Researchers and manufacturers are exploring alternatives to R-134a, including natural refrigerants like hydrocarbons (propane, isobutane) and carbon dioxide ($CO_2$) as well as a replacement for R-1234yf due to PFAS issues. These alternatives offer lower GWPs and improved environmental performance but may require modifications to existing equipment and safety standards.

As described above, R-134a is a hydrofluorocarbon (HFC) refrigerant that has been used in refrigeration and air conditioning systems since the 1990s. It is a non-flammable, non-toxic, and ozone-friendly refrigerant. However, R-134a has a high global warming potential (GWP), meaning that it contributes to climate change.

In recent years, there has been a growing interest in developing alternative refrigerants with lower GWPs. One promising alternative is a refrigerant of the disclosure that is made from recycled HFC/ODS waste streams. This refrigerant has a GWP of near 0, meaning that it does not contribute to climate change. It is also non-flammable and non-toxic, making it a safe and environmentally friendly refrigerant.

The formulation of the disclosure can be used in a variety of refrigeration and air conditioning applications. It is a drop-in replacement for R-134a, meaning that it can be used in existing systems without any modifications. It is also compatible with a variety of other refrigerants, making it a flexible and versatile refrigerant.

The development of this formulation is a significant step forward in the fight against climate change while addressing climate change by utilizing high GWP feed streams that contain legacy ODS materials. It is a safe, environmentally friendly, and cost-effective refrigerant that can be used to replace high-GWP refrigerants. The formulation of the disclosure has the potential to make a major impact on the global effort to reduce greenhouse gas emissions.

The disclosed formulation is shown in Table 2 below as a direct replacement for R-134a. The product, which includes a 91:9 R-32:R-125 component, has no ASHRAE designation or close formulations because there is no known manufacturing process until now to make this product.

TABLE 2

Formulations of the Disclosure Compared to R-134a and R-1234yf.

| Product | R-134a | R-1234yf | Range (Disclosure) | EXP 1 (Disclosure) | EXP 2 (Disclosure) |
|---|---|---|---|---|---|
| R-134a | 100.0 wt % | 0 wt % | 56.0-60.0 wt % | 58.0 wt % | 57.5 wt % |
| R-1234yf | 0 wt % | 100.0 wt % | 0 wt % | 0 wt % | 0 wt % |
| R-125 | 0 wt % | 0 wt % | 0.1-1.0 wt % | 0.50 wt % | 0.50 wt % |
| R-32 | 0 wt % | 0 wt % | 3.0-7.0 wt % | 5.00 wt % | 5.00 wt % |
| R-1234ze(E) | 0 wt % | 0 wt % | 35.0-38.0 wt % | 36.5 wt % | 36.0 wt % |
| $CO_2$ | 0 wt % | 0 wt % | 0-5 wt % | 0% wt % | 1.0 wt % |
| POE Lube | 0 wt % | 0 wt % | 0 wt % | 0 wt % | 0 wt % |
| TOTAL | 100.0 wt % | 100.0 wt % | 100.0 wt % | 100.0 wt % | 100.0 wt % |
| Pressure at 70° F. (psia) | 85.7 | 88.6 | | 85.0 | 92.8 |
| GWP* | 1430 | 2 | | 881.0 | 873.87 |
| 100% Reclaim GWP | 0 | 0 | 0 | 0 | 0 |
| Theoretical BP(° F.) | -14.98 | -22 | | -12.84 | -13.85 |

*GWP assuming no recycled materials, which if recycled, have zero net GWP.

Utilizing all reclaimed components, the formulation would achieve a GWP reduction of nearly 100%, i.e., a GWP of zero, however, using the formulation of the disclosure combined with R-1234ze(E) along with waste stream R-134a will yield a near zero, drop-in replacement for R-134a. Not only will this solve a technical issue, it will also provide a circular solution for the many millions of pounds of materials that will be vented into the atmosphere to avoid destruction fees. Even if $CO_2$ (which has a GWP of 1) is present in the formulation, 5 wt % of $CO_2$ would net a GWP of 0.05 for the formulation, and a 1 wt % presence of $CO_2$ in the formulation will net a GWP of 0.01. The performance curves in the drawing figures show the "Drop-In" potential of this refrigerant. Currently, only 1.6% of HFC's calculated as CO2e- ($CO_2$ equivalents) are recycled.

The two isomers of tetrafluoropropene yield different decomposition products with different effects on the environment.

R-1234ze(E) is a tetrafluoropropene trans isomer which can be compared to the cis isomer R-1234yf:

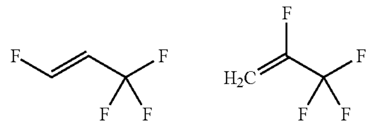

R-1234ze(E) has fluorine atoms on both sides of the double bond. In comparison, R-1234yf has fluorine atoms only on one side of the double bond.

R-1234yf forms TFF ($CF_3COF$) after reacting with water in the atmosphere to ultimately form TFA. TFA is known to be contaminating world-wide water supplies. The formulation of the disclosure utilizes R-1234ze(E) has a lifetime in the atmosphere of approximately 4 days.

In the atmosphere there are two decomposition pathways that R-1234yf undergoes. The first pathway is the reaction with hydroxyl radicals (—OH), which produces a 100% yield of trifluoroacetyl fluoride ($CF_3COF$, TFF) while reaction with chlorine radicals produces a 92% yield of TFF:

$$CH_2{=}CFCF_3 + {-}OH \rightarrow CH_3COF + H_2O + XO_2 \quad (1)$$

$$CH_2{=}CFCF_3 + Cl{-} \rightarrow 0.92CF_3COF + 0.568HC(O)Cl + XO_2 + CO \quad (2)$$

The products (intermediates) of pathway (1) are TFF and formaldehyde (HCHO) and pathway (2) TFF and formyl chloride (HC(O)Cl). TFF then reacts rapidly with atmospheric moisture ($H_2O$) to form trifluoroacetic acid ($CF_3COOH$, TFA):

$$CF_3COF + H_2O \rightarrow CF_3COOH + CO_2 + HF \quad (3).$$

R-1234yf has 4 fluorine atoms on one side of the double bond, where the structure is $CH_2{=}CFCF_3$. The attack is thus:

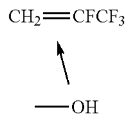

The result is that all 4 fluorine atoms are present in the decomposition product $CF_3COF$ (TFF), representing the decomposition product from the right side of the double bond. For R-1234ze(E), one fluorine is on the left side of the double bond and three fluorines on the right side of the double bond. The attack is thus:

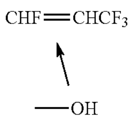

The decomposition products are HCOF and $CF_3COH$, which are the two oxygenated products resulting from the splitting of the molecule at the double bond.

Therefore, R-1234ze(E) does not form TFF.

The advantageous properties of the formulation of the disclosure and its suitability as a drop-in replacement for R-134a or R-1234yf are illustrated in the drawing figures.

FIG. 1 shows the liquid phase pressure (psia) versus temperature (° F.) relationship of the product of the disclosure and R-134a. As can be seen, there is a close correlation with R-134a, especially at temperatures lower than 50° F. At 50° F. there is a gap of about 8 psia which goes to 0 psia at temperatures less than about −40° F.

Figure 1A:
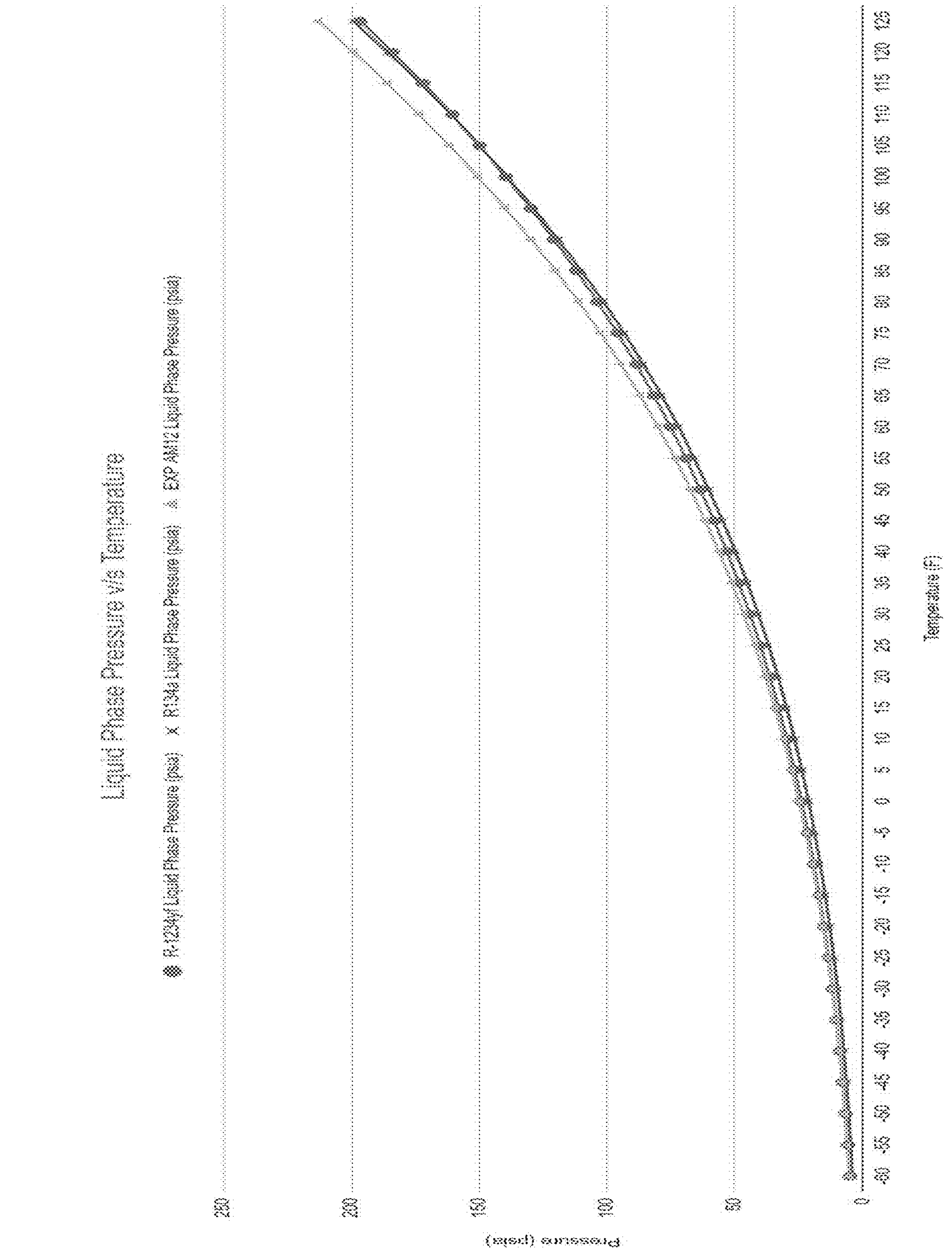
FIG. 1A depicts the liquid phase pressure-temperature curve of the refrigerant compositions of the disclosure compared to R-134a and R-1234yf.

FIG. 1A shows the liquid phase pressure (psia) versus temperature (° F.) relationship of the product of the disclosure with R-1234yf and R-134a. As can be seen, there is a close correlation with R-1234yf and R-134a, especially at temperatures lower than 50° F. At 50° F. there is a gap of about 8 psia for R-134a, which goes to 0 psia at temperatures less than about −40° F. At 50° F. there is a gap of about 4 psia for R-1234yf, which goes to 0 psia at temperatures less than about −40° F. However, this gap for R-1234yf will have no substantive effect on the performance of the refrigerant.

Figure 2:
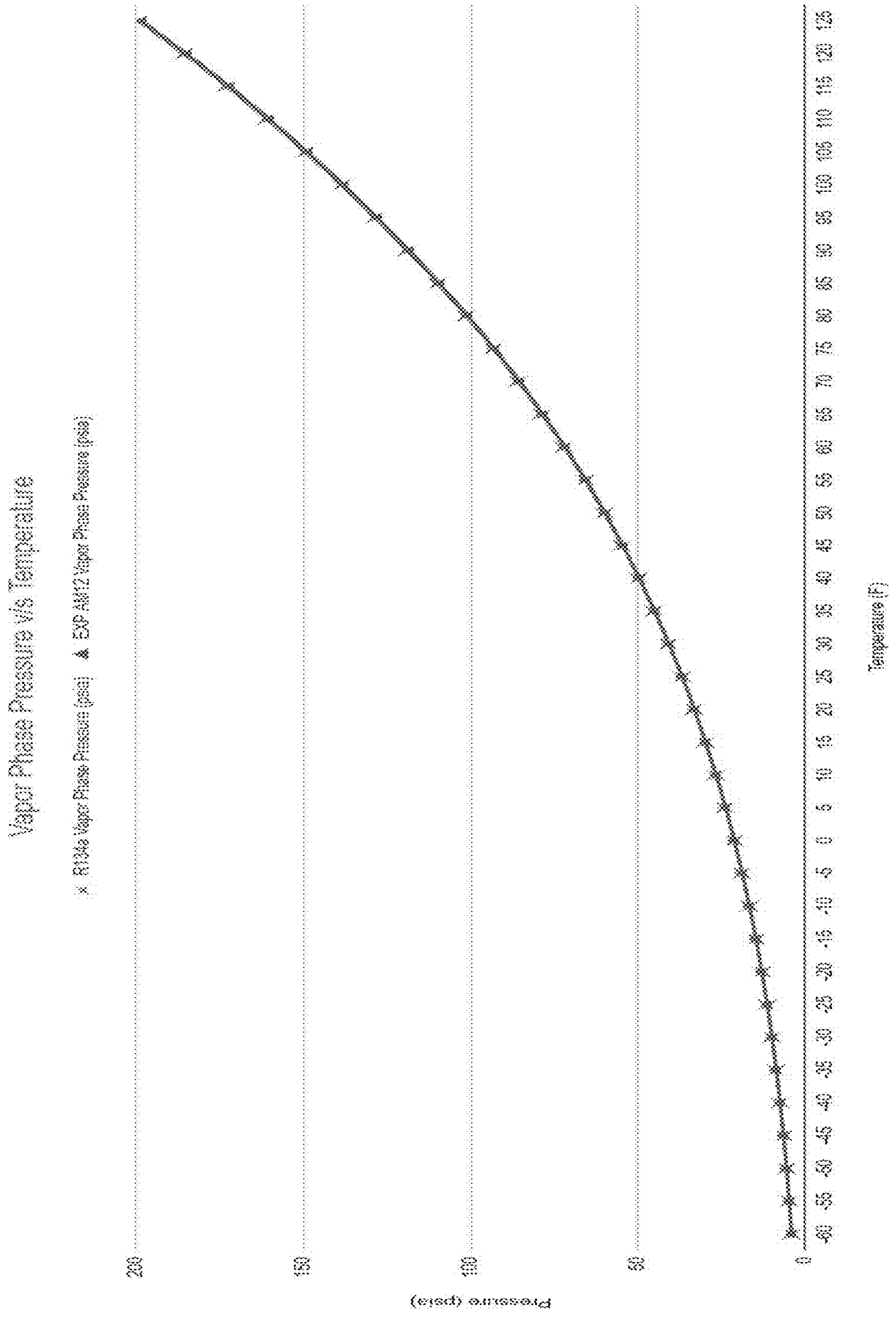

FIG. 2 shows the vapor phase pressure (psia) versus temperature (° F.) relationship of the product of the disclosure compared to R-134a. As can be seen there is almost complete overlap over the entire temperature range from −60° F. to 125° F.

Figure 2A:
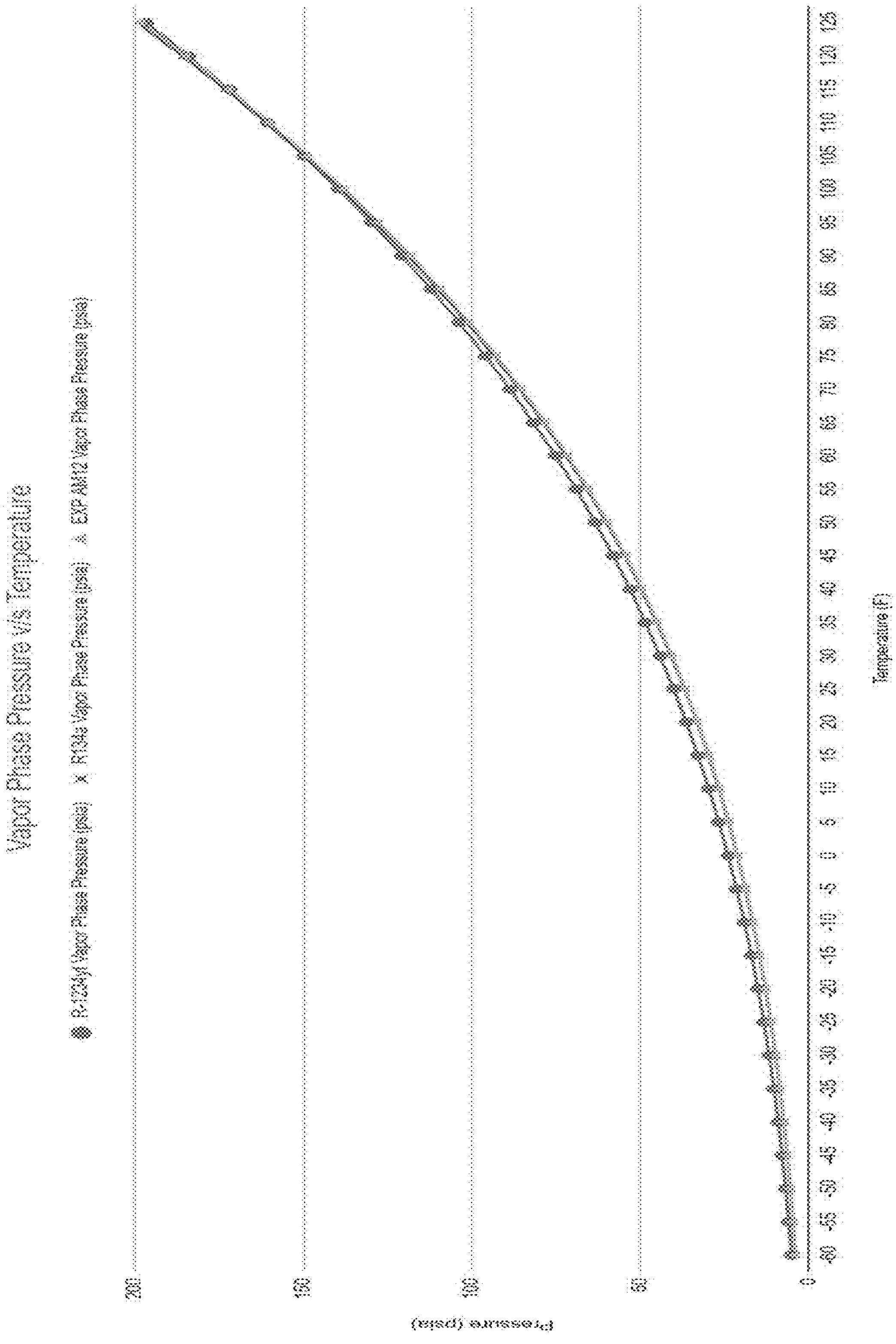
FIG. 2A depicts the vapor-phase pressure-temperature curve of the refrigerant compositions of the disclosure compared to R-134a and R-1234yf.

FIG. 2A shows the vapor phase pressure (psia) versus temperature (° F.) relationship of the product of the disclosure compared to R-1234yf and R-134a. As can be seen, for R-134a there is almost complete overlap over the entire temperature range from −60° F. to 125° F. The R-1234yf curve shows overlap at greater than 90° F. and less than about −40° F. Between these two regimes there is a slight bellying of the between the R-1234yf curve and the other two curves, which reaches a maximum of about 5 psia at 55° F.

Figure 3:
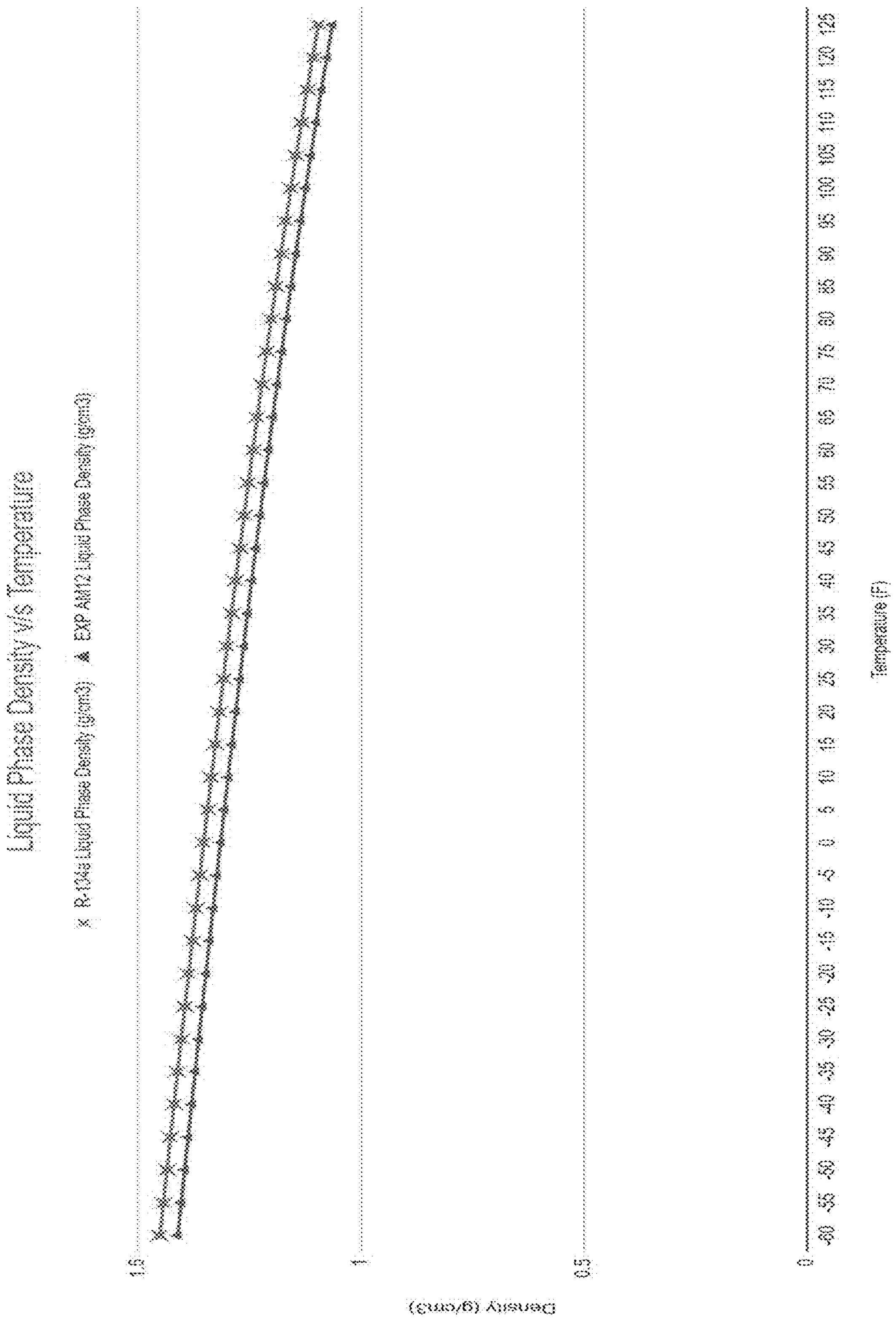

FIG. 3 shows the liquid phase density (g/$cm^3$) versus temperature (° F.) of the product of the disclosure compared to R-134a. There is a close correspondence over the entire temperature range, with a gap of about 0.03 g/$cm^3$.

Figure 3A:
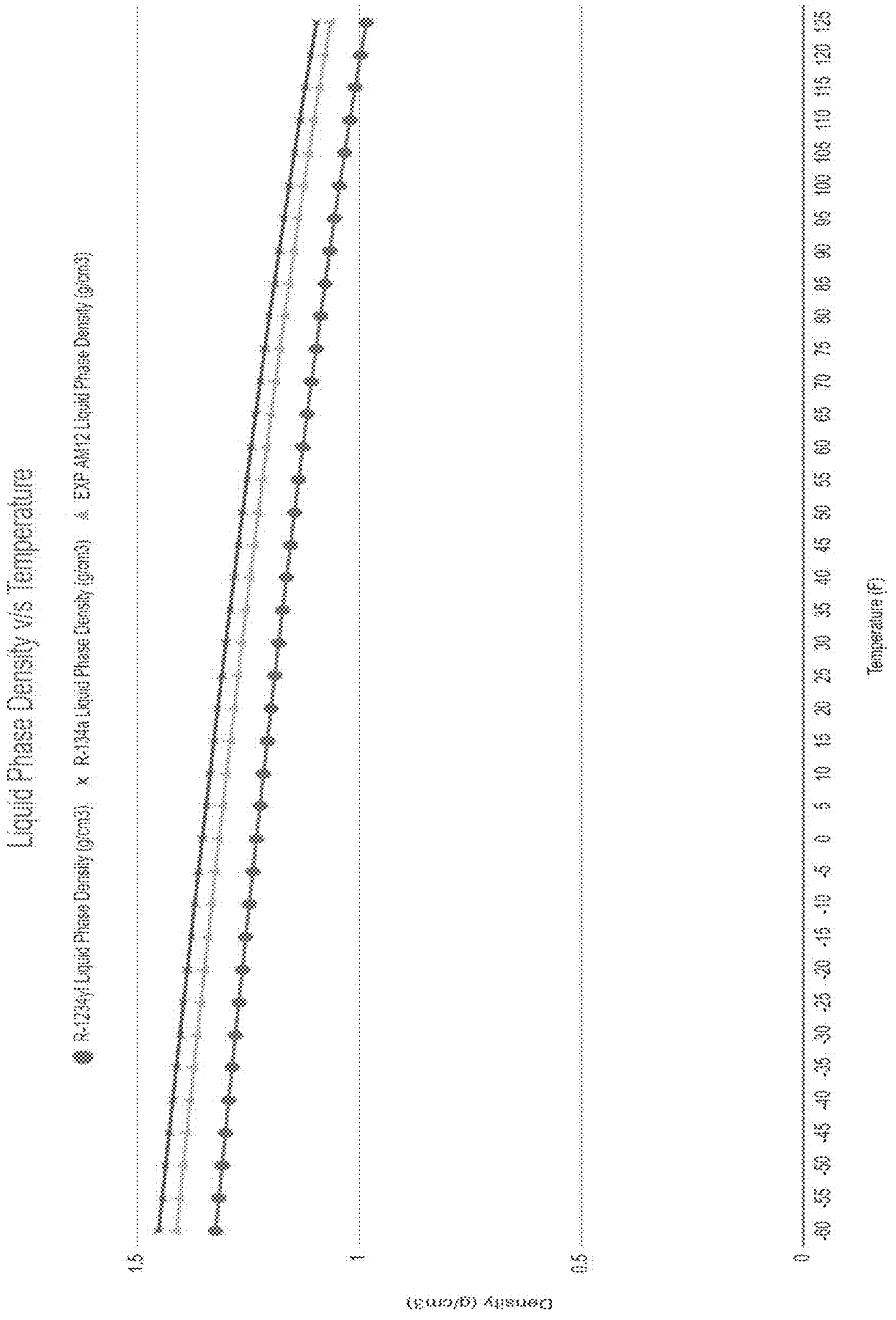
FIG. 3A depicts the liquid density-temperature curve of the refrigerant compositions of the disclosure compared to R-134a and R-1234yf.

FIG. 3A shows the liquid phase density (g/$cm^3$) versus temperature (° F.) of the product of the disclosure compared to R-1234yf and R-134a. There is a close correspondence over the entire temperature range between the product of the disclosure and R-134a, with a gap of about 0.03 g/$cm^3$. The curve for R-1234yf also has a corresponding performance with a density of about 1.11 at 70° F., but with a slightly larger gap of about 0.08 g/$cm^3$.

Figure 4:
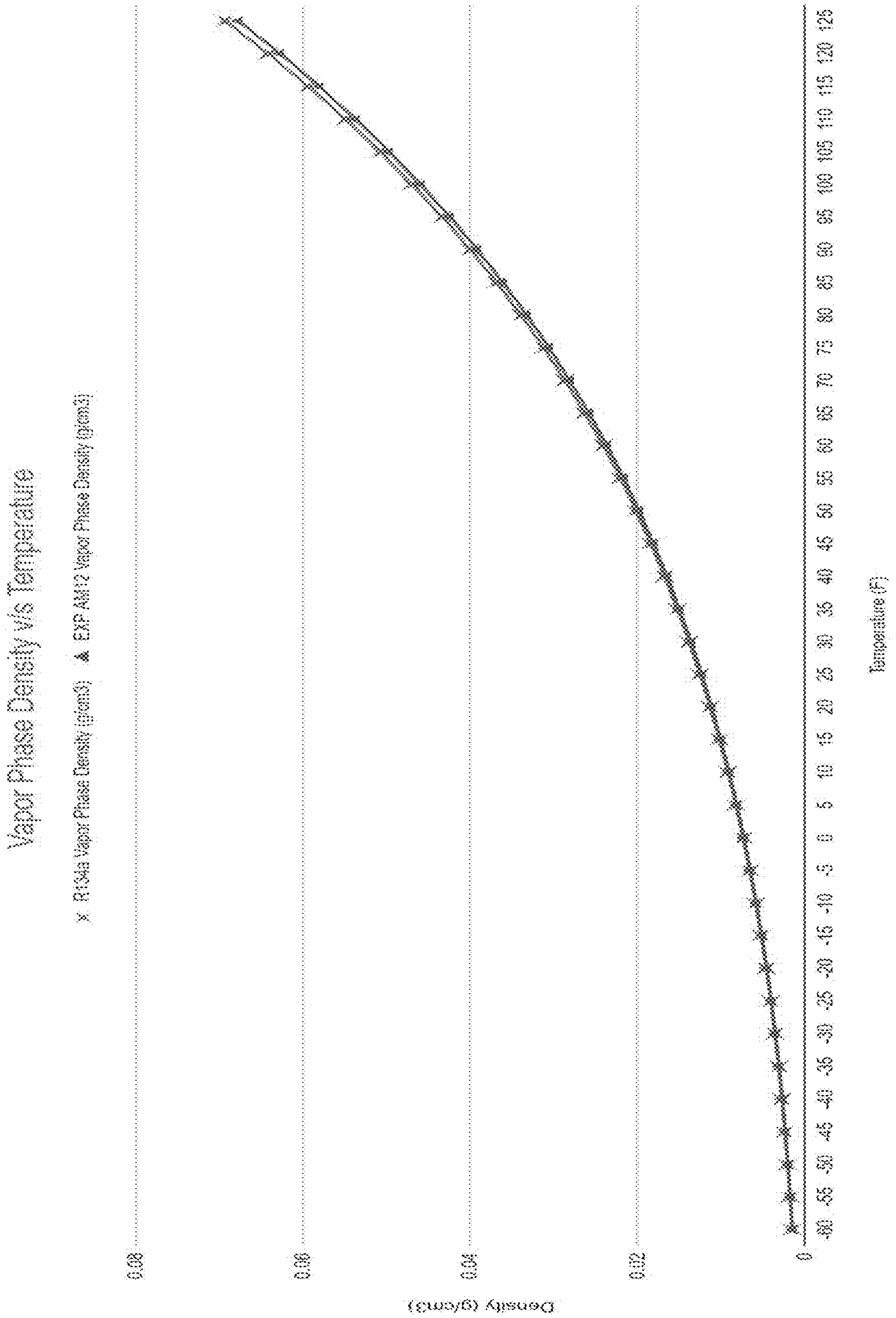

FIG. 4 shows the vapor phase density (g/$cm^3$) versus temperature (° F.) of the product of the disclosure compared to R-134a. There is an almost complete overlap over the entire temperature range, with the exception of R-134a having a slightly higher density at temperatures greater than about 70° F.

Figure 4A:
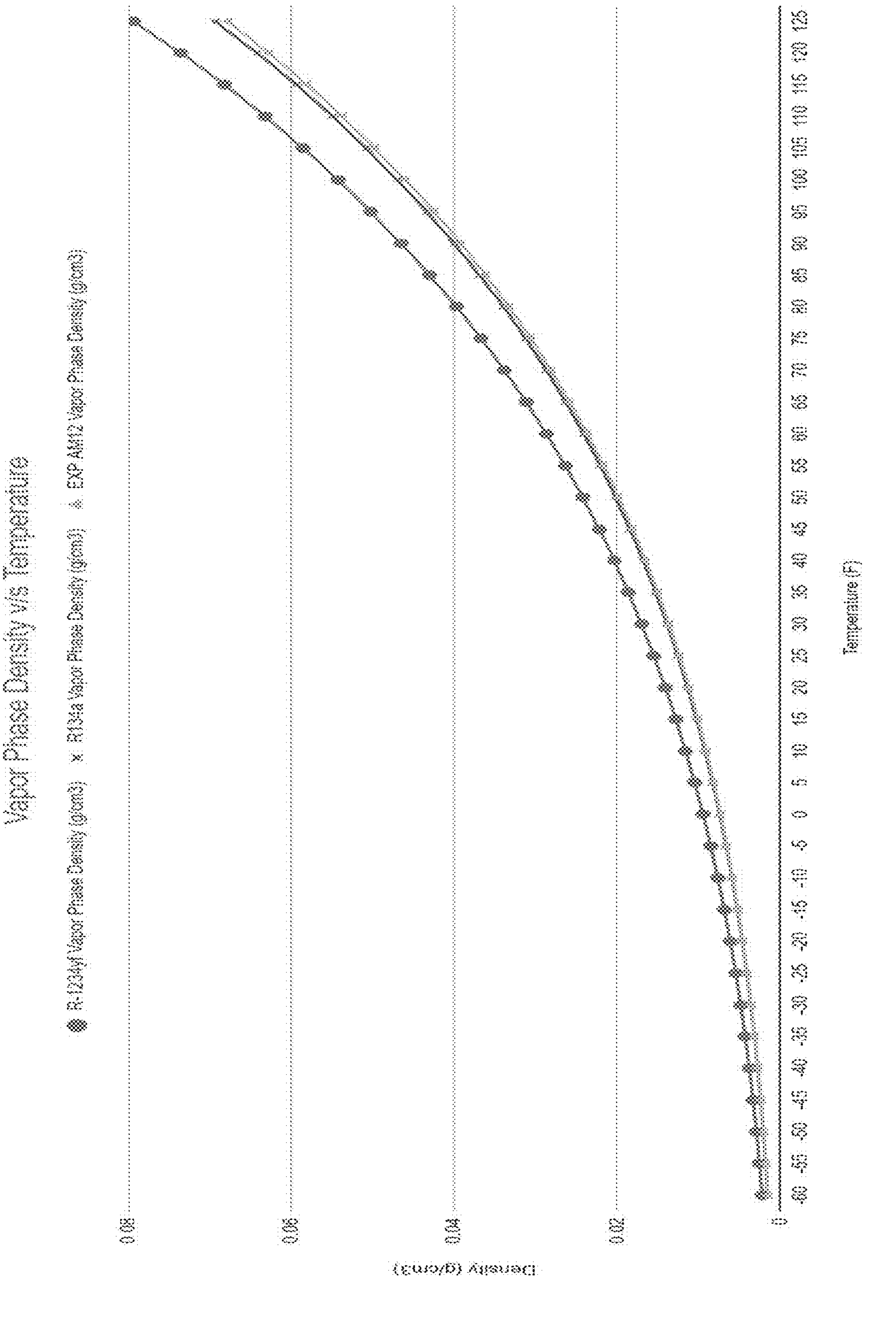
FIG. 4A depicts the vapor density-temperature curve of the refrigerant compositions of the disclosure compared to R-134a and R-1234yf.

FIG. 4A shows the vapor phase density (g/$cm^3$) versus temperature (° F.) of the product of the disclosure compared to R-1234yf and R-134a. There is an almost complete overlap of the product of the disclosure and R-134a over the entire temperature range, with the exception of R-134a having a slightly higher density at temperatures greater than about 70° F. The R-1234yf curve shows a slightly higher vapor density with a similarly shaped curve. At 70° F., the difference is about 0.006 g/$cm^3$, which is acceptable.

Figure 5:
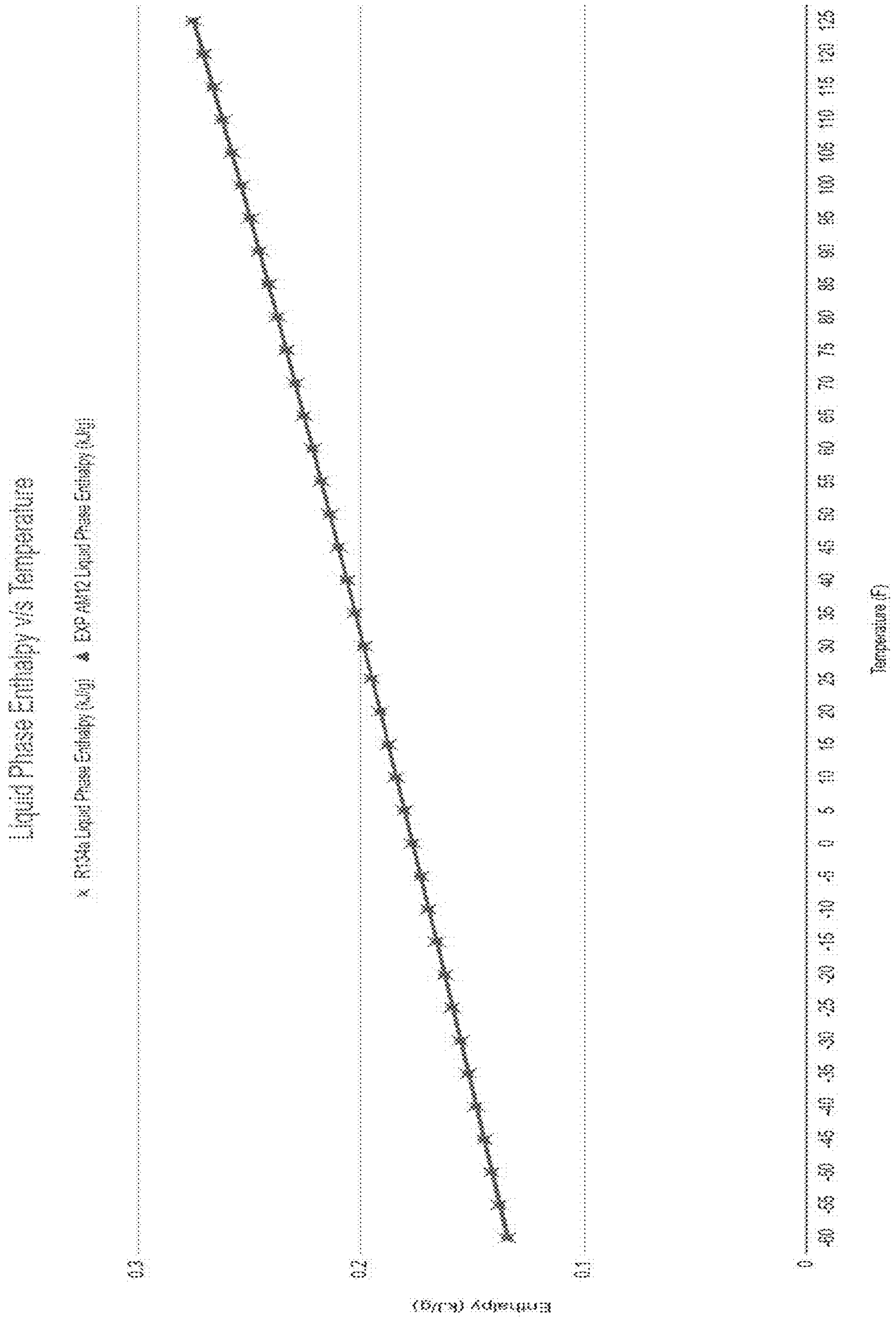

FIG. 5 shows the liquid phase enthalpy (kJ/g) versus temperature (° F.) relationship of the product of the disclosure compared to R-134a. As can be seen, there is a close correlation, i.e. overlap, over the entire temperature range with an enthalpy of about 0.2 kJ/g at 30° F.

Figure 5A:
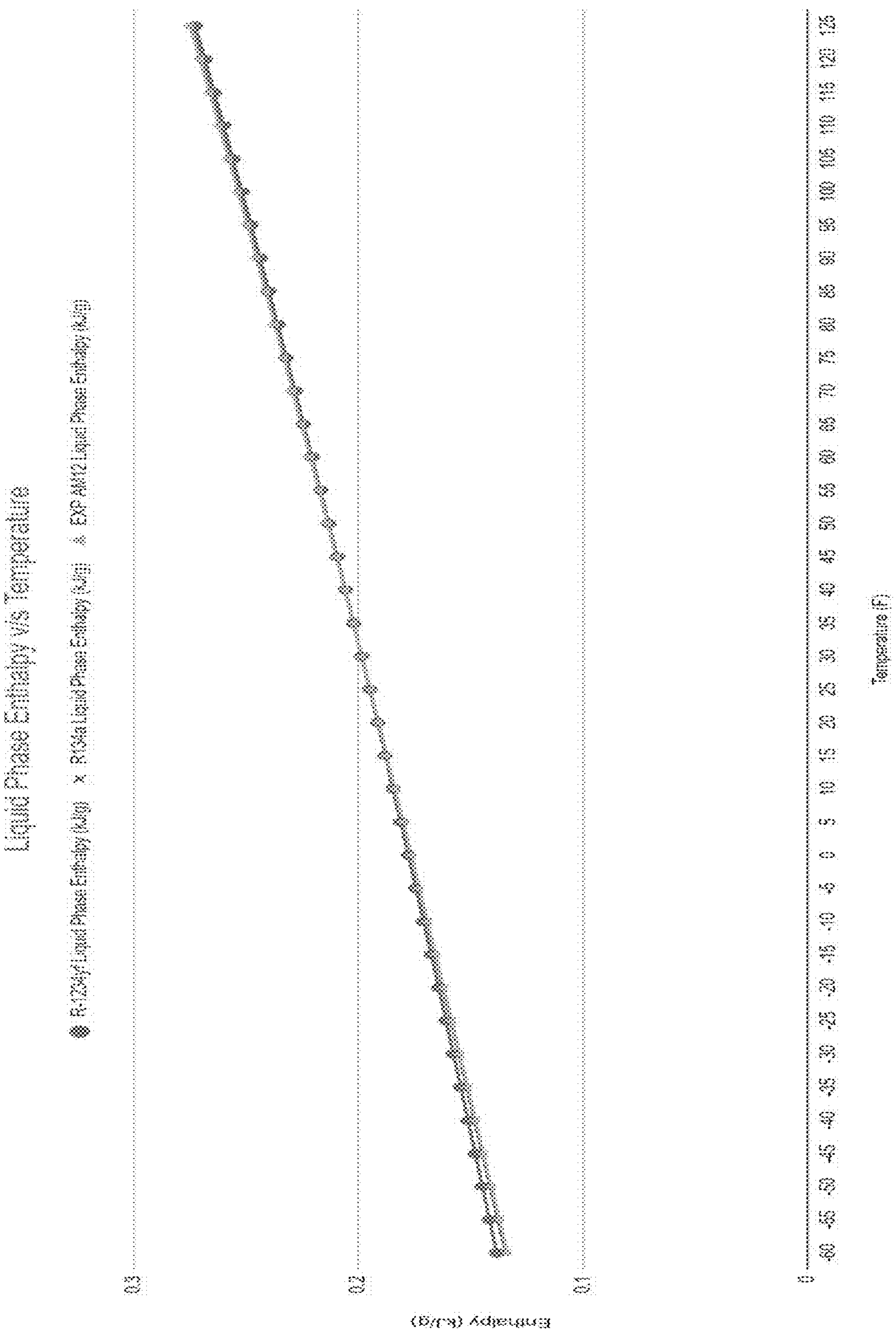
FIG. 5A depicts the liquid phase enthalpy versus temperature curve of the refrigerant compositions of the disclosure compared to R-134a and R-1234yf.

FIG. 5A shows the liquid phase enthalpy (kJ/g) versus temperature (° F.) relationship of the product of the disclosure compared to R-1234yf and R-134a. As can be seen, there is a close correlation, i.e. overlap, over the entire temperature range with an enthalpy of about 0.2 kJ/g at 30° F. and 0.001 kJ/g at 70° F.

Figure 6:
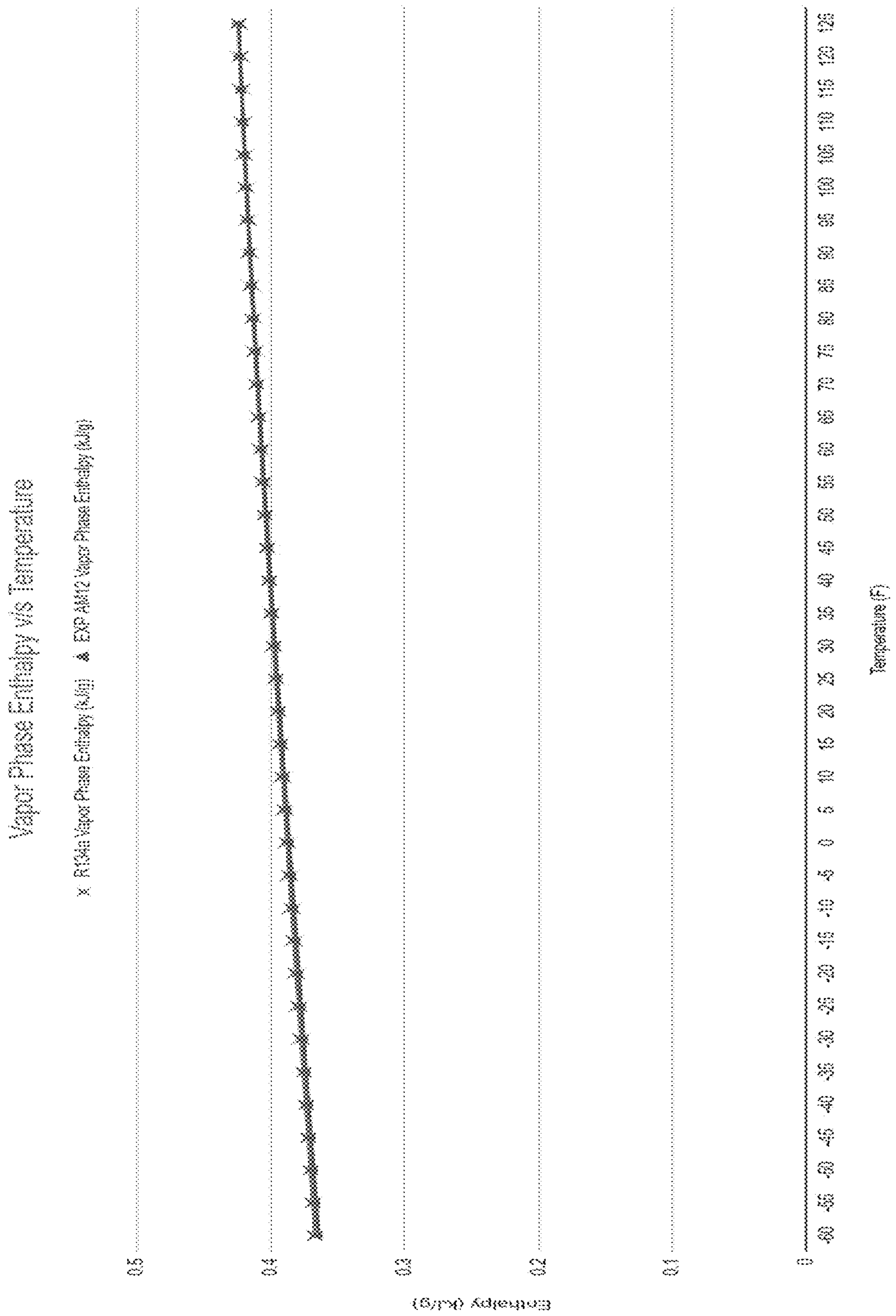

FIG. 6 shows the vapor phase enthalpy (kJ/g) versus temperature (° F.) relationship of the product of the disclosure compared to R-134a. As can be seen, there is a close correlation, i.e., overlap over the entire temperature range, which indicates an identical work function compared to R-134a with an enthalpy of about 0.4 kJ/g at 30° F. and 0.4 kJ/g at 70° F.

Figure 6A:
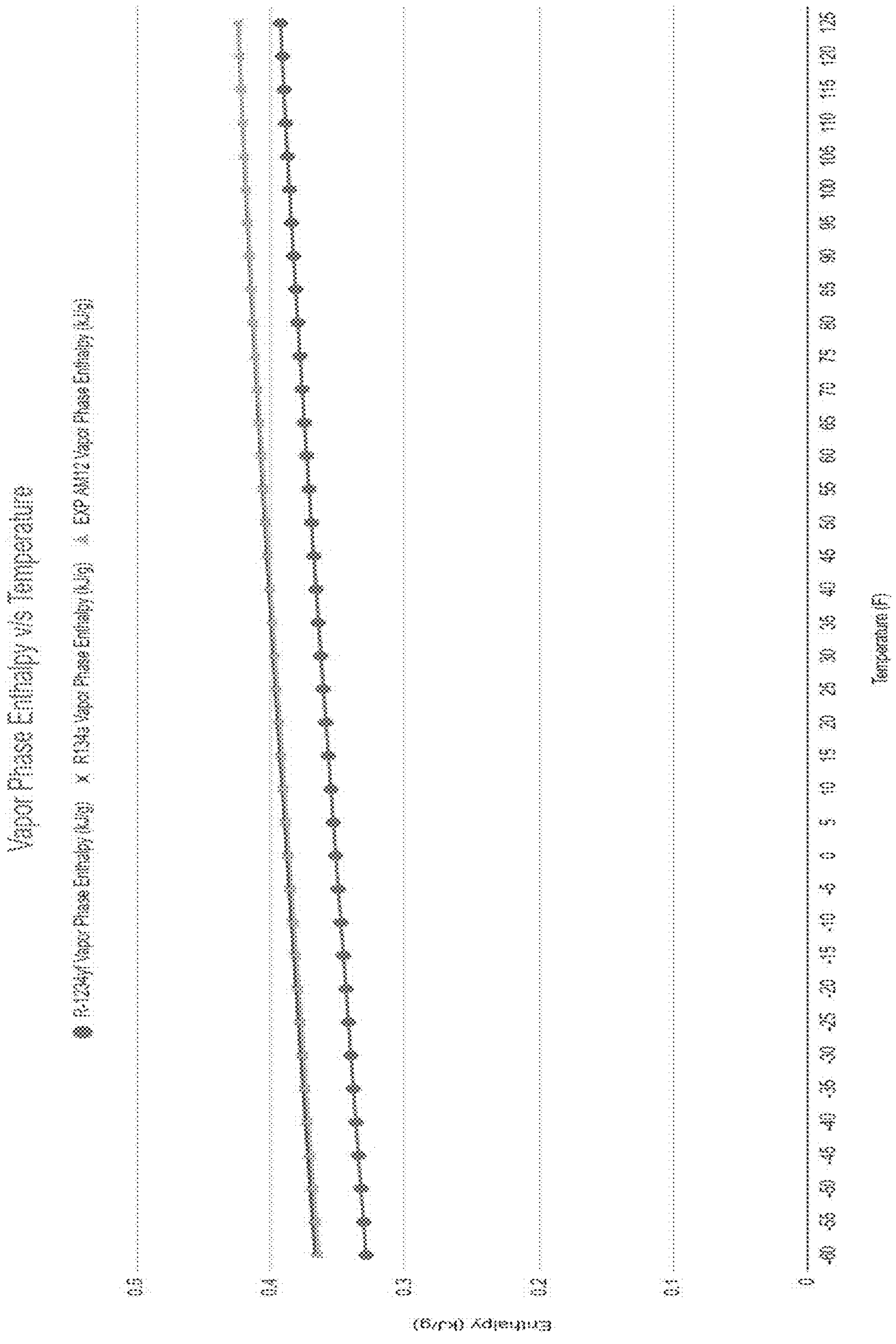
FIG. 6A depicts the vapor phase enthalpy versus temperature curve of the refrigerant compositions of the disclosure compared to R-134a and R-1234yf.

FIG. 6A shows the vapor phase enthalpy (kJ/g) versus temperature (° F.) relationship of the product of the disclosure compared to R-1234yf and R-134a. As can be seen, there is a close correlation, i.e., overlap over the entire temperature range for R-134a and the product of the disclosure, which indicates an identical work function compared to R-134a with an enthalpy of about 0.4 kJ/g at 30° F. and 0.03 kJ/g at 70° F. R-1234yf has a slightly lower vapor phase enthalpy with an acceptable enthalpy difference of about 0.03 kJ/g at 30° F. and 0.03 kJ/g at 70° F.

Figure 7:
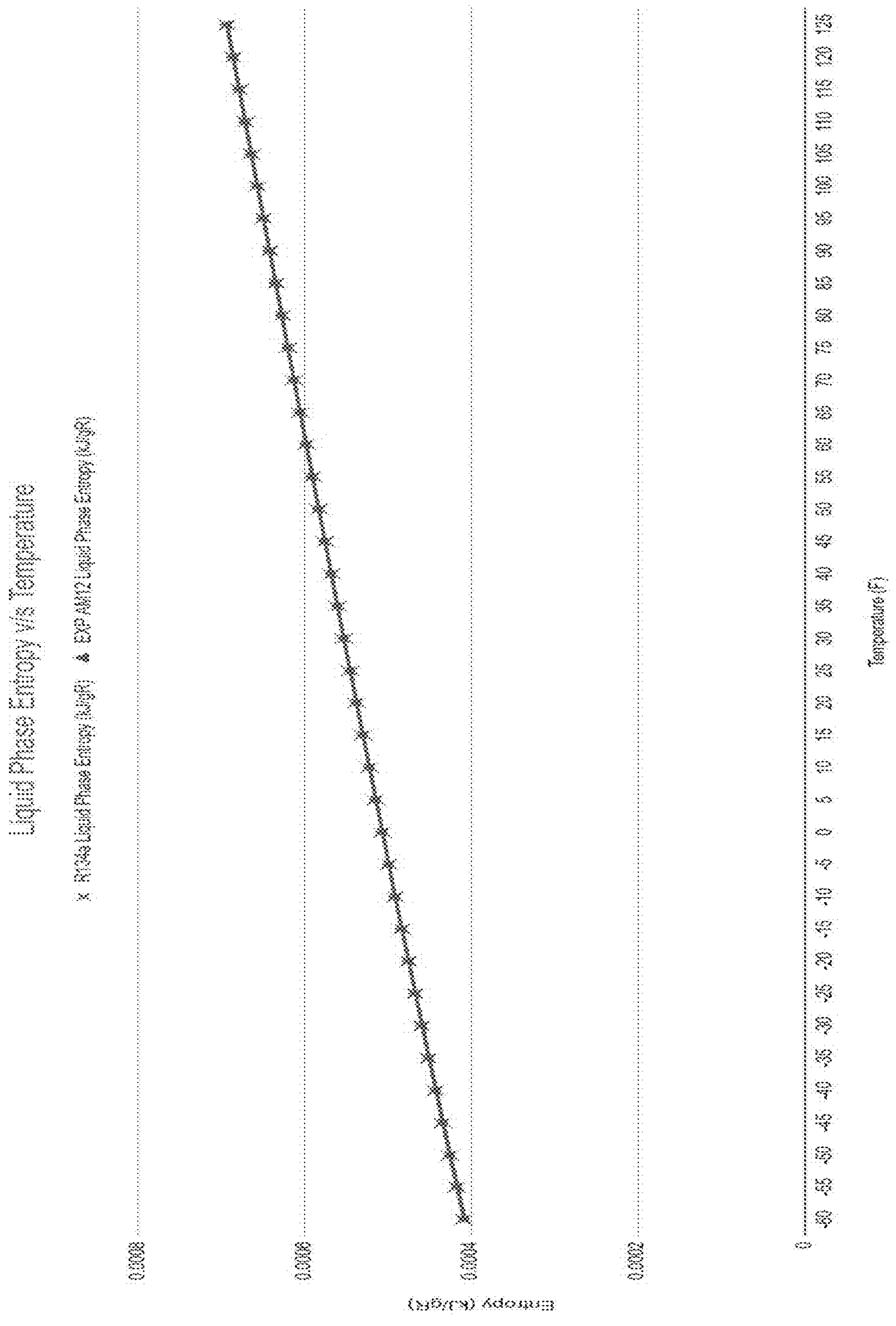

FIG. 7 shows the liquid phase entropy (kJ/gR) versus temperature (° F.) relationship of the product of the disclosure compared to R-134a. As can be seen, there is a close correlation, i.e., overlap, over the entire temperature range with an entropy of about 0.00055 kJ/gR at 30° F.

Figure 7A:
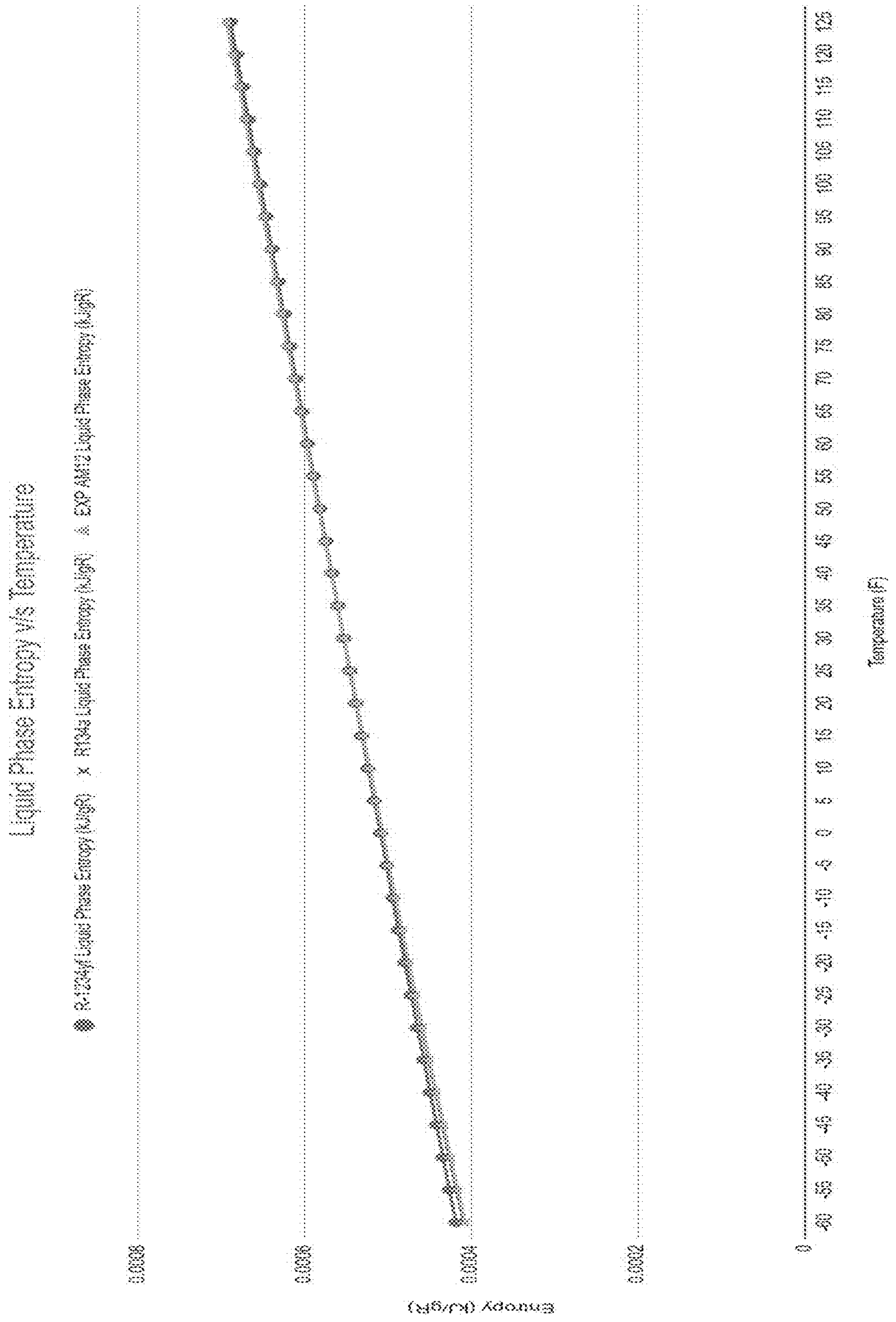
FIG. 7A depicts the liquid phase entropy versus temperature curve of the refrigerant compositions of the disclosure compared to R-134a and R-1234yf.

FIG. 7A shows the liquid phase entropy (kJ/gR) versus temperature (° F.) relationship of the product of the disclosure compared to R-1234yf and R-134a. As can be seen, there is a close correlation, i.e., overlap, over the entire temperature range with an entropy of about 0.00055 ($5.5\times10^{-4}$) kJ/gR at 30° F. and 0.00061 ($6.1\times10^{-4}$) kJ/gR at 70° F.

Figure 8:
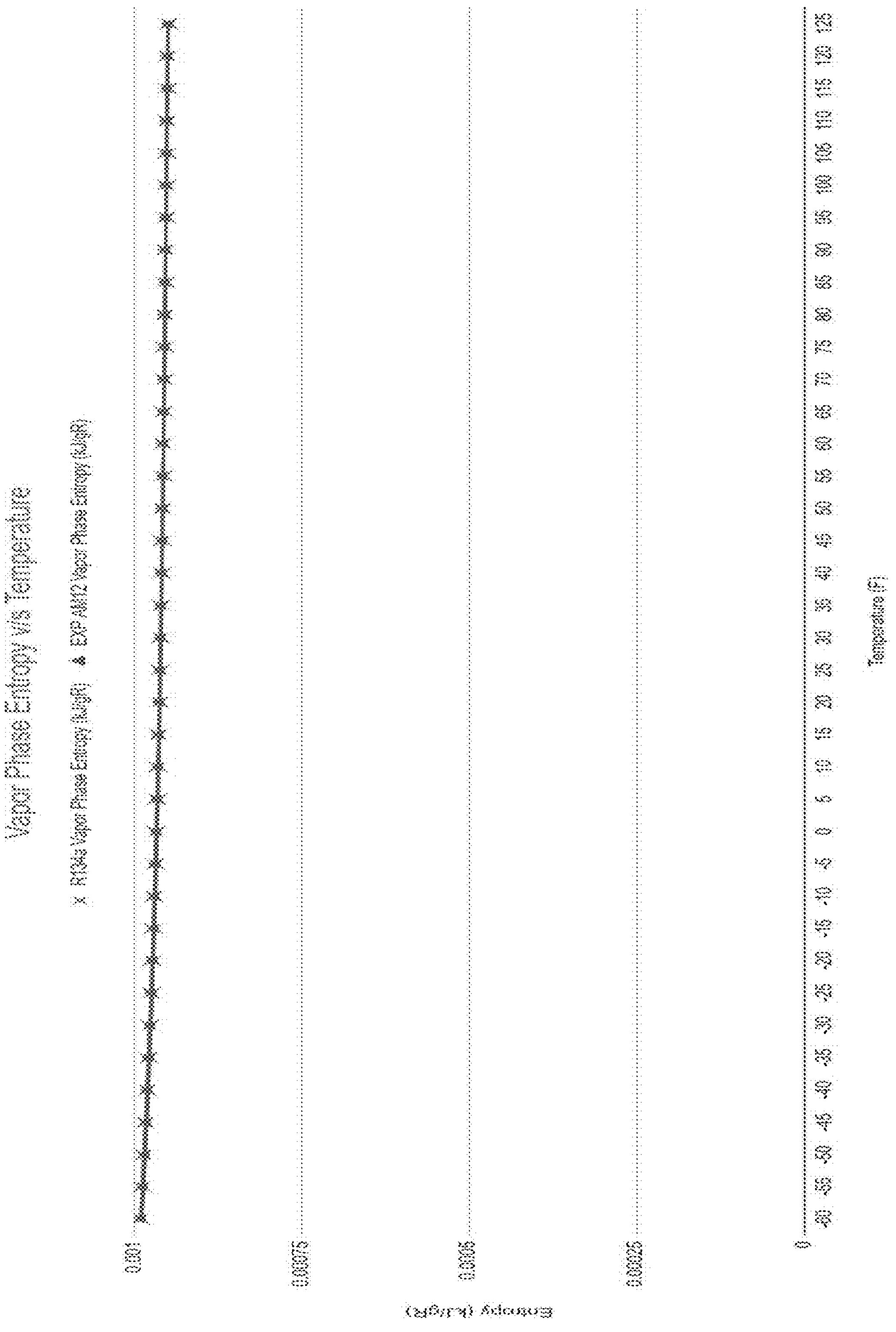

FIG. 8 shows the vapor phase entropy (kJ/gR) versus temperature (° F.) relationship of the product of the disclosure compared to R-134a. As can be seen, there is a close correlation, i.e., overlap, between the product of the disclosure and R-134a with an entropy of about 0.00096 at 30° F.

Figure 8A:
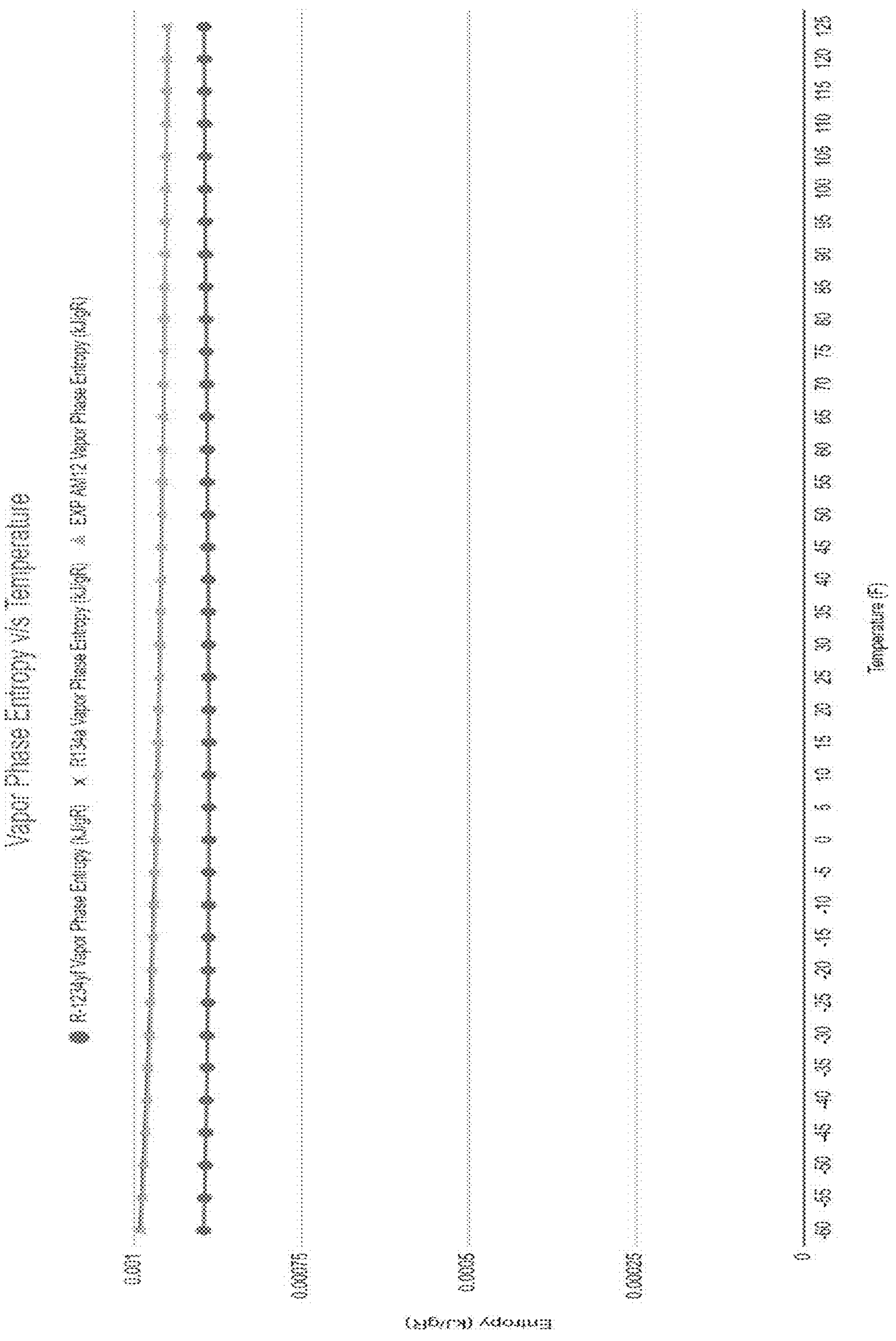
FIG. 8A depicts the vapor phase entropy versus temperature curve of the refrigerant compositions of the disclosure compared to R-134a and R-1234yf.

FIG. 8A shows the vapor phase entropy (kJ/gR) versus temperature (° F.) relationship of the product of the disclosure compared to R-1234yf and R-134a. As can be seen, there is a close correlation, i.e., overlap, between the product of the disclosure and R-134a with an entropy of about 0.00096 at 30° F. R-1234yf has a lower vapor phase entropy of 0.00089 ($8.9\times10^{-4}$) kJ/gR at 30° F. and about 00089 ($8.9\times10^{-4}$) kJ/gR at 70° F. This variance may infer a slightly higher work function for the product of the disclosure, but the 10-4 magnitude indicates that the product of the disclosure is acceptable as a drop in replacement for R-1234yf.

As is shown in FIGS. 5-8, the thermodynamic properties of the product of the disclosure are virtually identical to the thermodynamic properties of R-134a. As a result, the performance of the two products will be identical. The product of the disclosure is accordingly an ideal drop-in replacement for R-134a in such applications as, for example, automotive air conditioning systems.

The thermodynamic properties of the formulation of the disclosure at 70° F. compared to 91:9 R-32:R-125 mixture, R-134a, R-32, R-410A and R-454B are shown in Table 3.

TABLE 3

Thermodynamic properties of the product of the disclosure (EXP AM12) compared to 91:9 R-32:R-125, R-134a, R-32, R-410A and R-454B at 70° F.

| Material | Liquid Phase Pressure (psia) | Vapor Phase Pressure (psia) | Liquid Phase Density ($g/cm^3$) | Vapor Phase Density ($g/cm^3$) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| EXP AM12 | 95 | 85 | 1.19 | 0.028 | 0.23 | 0.41 | $6.1 \times 10^{-4}$ | $9.5 \times 10^{-4}$ |
| R-32/R-125-91/9 | 221 | 221 | 0.99 | 0.045 | 0.24 | 0.50 | $6.3 \times 10^{-4}$ | $1.1 \times 10^{-4}$ |
| R-134a | 86 | 86 | 1.22 | 0.029 | 0.23 | 0.41 | $6.1 \times 10^{-4}$ | $9.5 \times 10^{-4}$ |
| R-1234yf | 88.6 | 88.6 | 1.11 | 0.034 | 0.23 | 0.38 | $6.1 \times 10^{-4}$ | $8.9 \times 10^{-4}$ |
| R-32 | 221 | 221 | 0.98 | 0.042 | 0.24 | 0.52 | $6.3 \times 10^{-4}$ | $1.2 \times 10^{-4}$ |
| R-410A | 216 | 216 | 1.08 | 0.059 | 0.23 | 0.43 | $6.2 \times 10^{-4}$ | $1.0 \times 10^{-4}$ |
| R-454B | 205 | 198 | 1.00 | 0.045 | 0.24 | 0.47 | $6.2 \times 10^{-4}$ | $1.1 \times 10^{-4}$ |

As can be seen, the product of the disclosure (EXP AM12) has properties virtually identical to R-134a and is thus an excellent drop-in replacement for R-134a. EXP AM12 also closely mimics R-1234yf and thus is also an excellent drop-in replacement for R-1234yf. Also, the 91:9 R-32:R-125 mixture has properties comparable to R-410A and R454B.

The data in Table 3 can be compared to the properties at 0° F. shown in Table 4.

TABLE 4

Thermodynamic properties of the product of the disclosure (EXP AM12) compared to 91:9 R-32:R-125, R-134a, R-32, R-410A and R-454B at 0° F.

| Material | Liquid Phase Pressure (psia) | Vapor Phase Pressure (psia) | Liquid Phase Density ($g/cm^3$) | Vapor Phase Density ($g/cm^3$) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| EXP AM12 | 24.9 | 21.1 | 1.31 | 0.007 | 0.18 | 0.39 | $5.1 \times 10^{-4}$ | $9.6 \times 10^{-4}$ |
| R-32/R-125-91/9 | 64.0 | 64.0 | 1.13 | 0.013 | 0.17 | 0.49 | $4.9 \times 10^{-4}$ | $1.2 \times 10^{-3}$ |
| R-1234yf | 23.9 | 23.9 | 1.23 | 0.001 | 0.18 | 0.35 | $5.1 \times 10^{-4}$ | $8.9 \times 10^{-4}$ |
| R-134a | 21.2 | 21.2 | 1.35 | 0.007 | 0.18 | 0.39 | $5.1 \times 10^{-4}$ | $9.7 \times 10^{-4}$ |
| R-32 | 64.0 | 64.0 | 1.11 | 0.012 | 0.17 | 0.51 | $4.9 \times 10^{-4}$ | $1.2 \times 10^{-3}$ |
| R-410A | 63.1 | 63.0 | 1.24 | 0.017 | 0.17 | 0.41 | $5.0 \times 10^{-4}$ | $1.0 \times 10^{-3}$ |
| R-454B | 60.0 | 57.4 | 1.14 | 0.013 | 0.17 | 0.45 | $5.0 \times 10^{-4}$ | $1.1 \times 10^{-3}$ |

As can be seen, the thermodynamic properties of the product of the disclosure (EXP AM12) and R-134a are virtually identical at lower temperatures. The product of the disclosure is therefore suitable as a drop-in replacement for R-134a in refrigeration equipment as well as air conditioning equipment. The product of the disclosure can also be used as an OEM refrigerant on equipment designed for R-134a refrigerant.

The refrigerant of the disclosure as well as the 91:9 R-32:R-125 mixture is a zeotrope. A zeotropic mixture, or non-azeotropic mixture, is a mixture with liquid components that have different boiling points. Individual substances within the mixture do not evaporate or condense at the same temperature as one substance. In other words, the mixture has a temperature glide, as the phase change occurs in a temperature range of about four to seven degrees Celsius, rather than at a constant temperature. Azeotropic and zeotropic mixtures have different dew and bubble curves characteristics in a temperature-composition graph. Namely, azeotropic mixtures have dew and bubble curves that intersect, but zeotropic mixtures do not. In other words, zeotropic mixtures have no azeotropic points. An azeotropic mixture that is near its azeotropic point has negligible zeotropic behavior and is near-azeotropic rather than zeotropic. Zeotropic mixtures differ from azeotropic mixtures in that the vapor and liquid phases of an azeotropic mixture have the same fraction of constituents. This is due to the constant boiling point of the azeotropic mixture.

Reclamation Streams and Background

FIG. 9 and FIG. 9A is a reclamation summary of data by the U.S. EPA for the reclamation history of ODS (ozone-depleting substances) as well as HFCs. One can observe the category of the growing quantities of HFCs that are classified as "mixed". These highly mixed HFCs that can also contain ODS streams is a growing environmental category of carbon pollution with no known uses. The virgin manufactured solutions that are formulated HFC/HFO blends (like the R-454B benchmark enclosed) to have lower GWP will continue to grow the mixed category or will be vented into the atmosphere at the end of life without appropriate technology for recycling and decarbonization.

Figure 10:
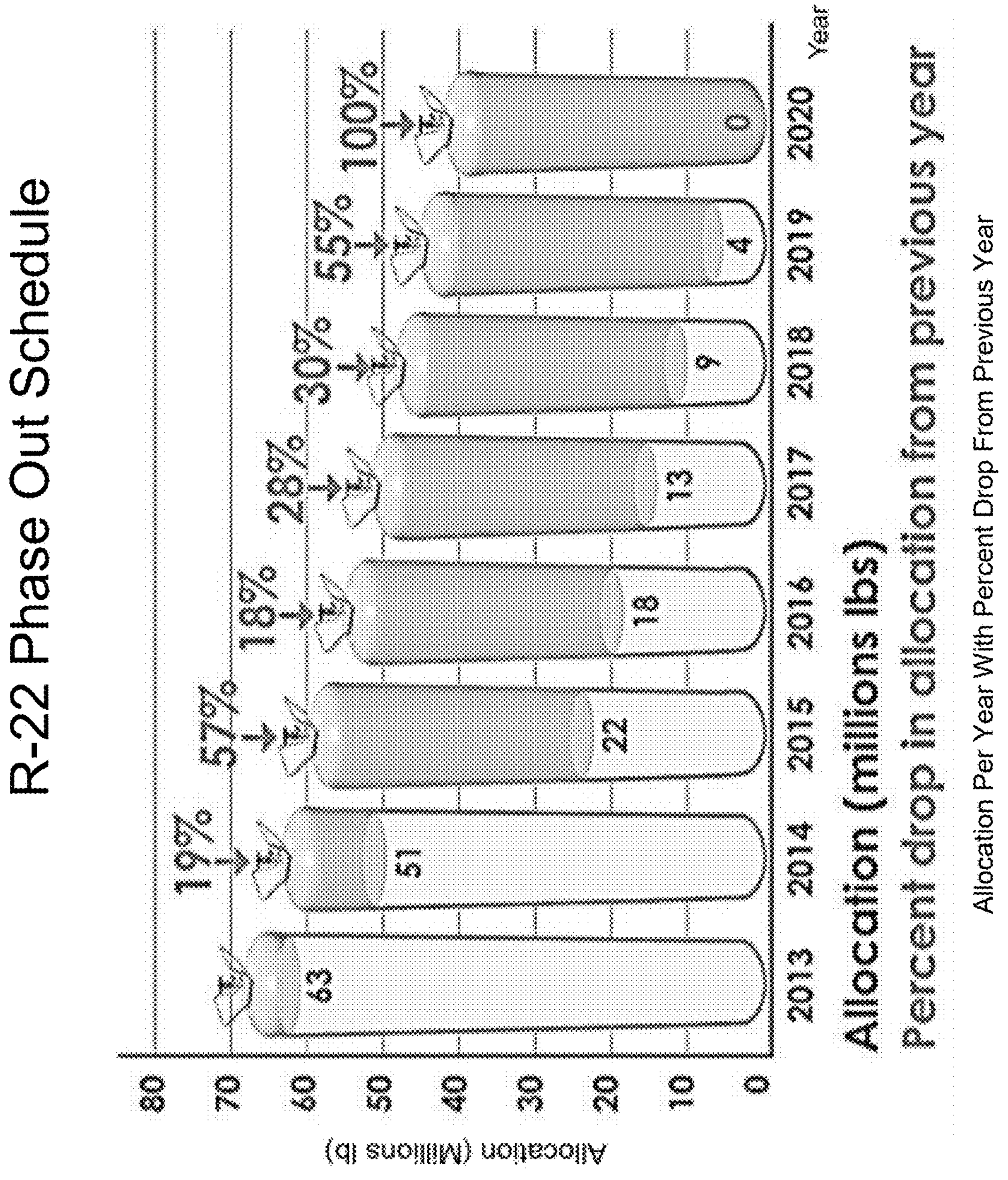
FIG. 10 depicts the R-22 phase-out schedule.

Although ODS (R-22) was phased out on the schedule shown in FIG. 10, with an allocation of 0 pounds scheduled for 2020. R-22 is still the largest reclaimed product in the U.S. and based on history, will take many years to completely phase out. R-22 is a single molecule and much easier to reclaim with single plate distillation than complex HFCs. HFC blends and mixed HFCs require a much more complicated technology in order to reprocess.

Figure 11:
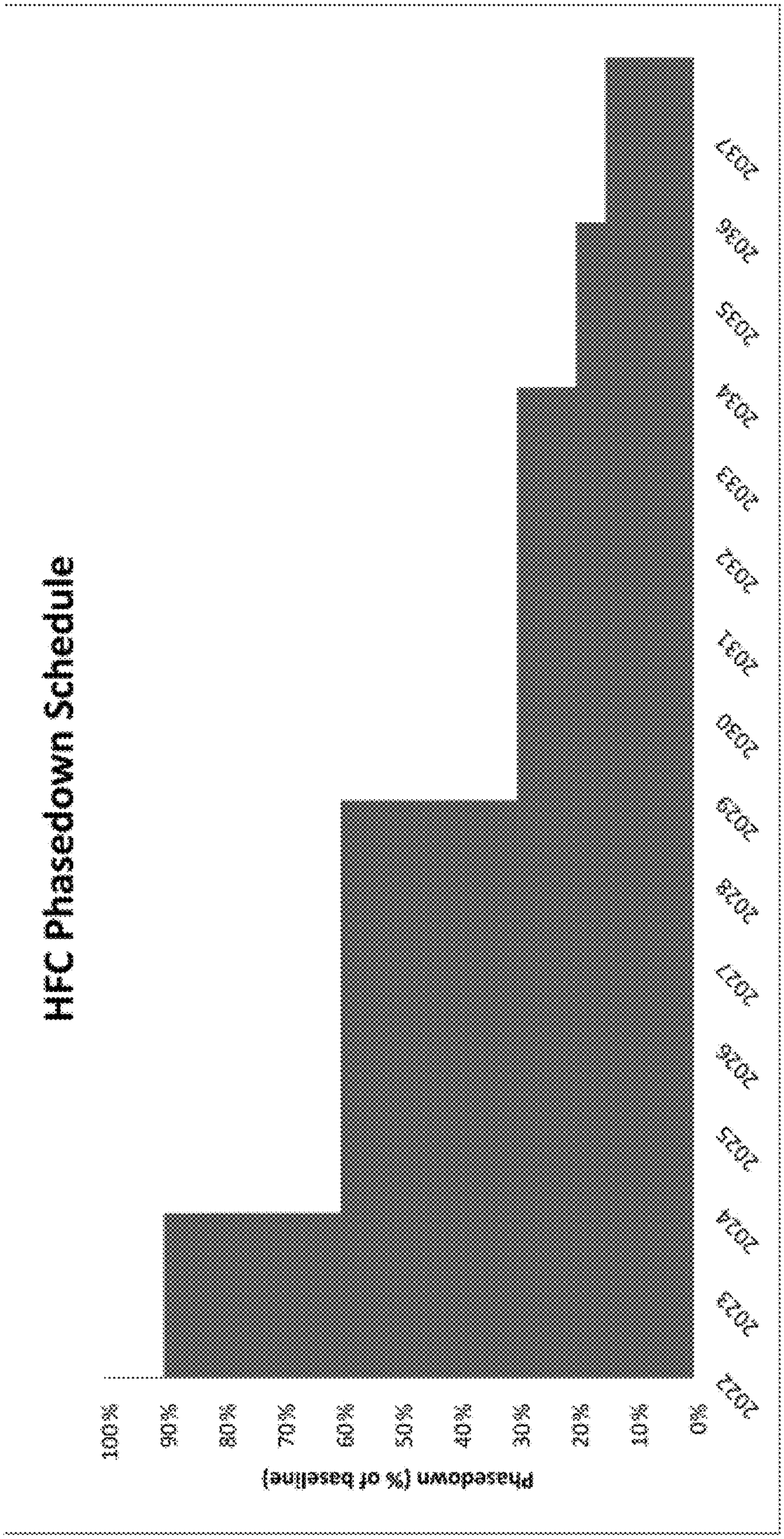
FIG. 11 depicts the HFC phasedown schedule.

FIG. 11 depicts the AIM ACT HFC phasedown schedule from 2022 to 2037. Over this time frame, the phasedown goes from a 90% reduction in 2022 down to 15% in 2037.

Components of the refrigerant formulation of the disclosure contain reclaimed material. The EPA defines refrigerant reclamation as a means to reprocess refrigerant to at least the purity specified in Appendix A of 40 C.F.R. § 82, subpart F (based on AHRI Standard 700-1993, Specifications for Fluorocarbon and Other Refrigerants) and to verify this purity using the analytical methodology prescribed in appendix A. The EPA requires that refrigerant be reclaimed when a certified technician recovers refrigerant and puts it in a special DOT container and has no intention of putting it back in the same system from which it was recovered.

In the disclosure, the refrigerant must be reclaimed to the AHRI Standard 700 of purity by a certified reclaimer. This requirement protects the integrity of used refrigerant to prevent damage to air-conditioning and refrigeration equipment. Contaminated refrigerants can lead to increased repair costs, shortened maintenance intervals, decreased equipment lifespan, increased leak rates, and a reduction in consumer confidence in reclaimed refrigerants. Once the reclaimed refrigerant is brought up to standard, it can be used at least partially or wholly in the formulations of the disclosure.

Formulations with reclaimed material results in a dramatic reduction in GWP, because the reclaimed material is not being released into the atmosphere. Formulations with all reclaimed material results in a net GWP of about 0 and reduces the requirement to run virgin HFC/HFO plants in various parts of the world.

Unexpected advantages arise from the utilization of recycled materials. The American Innovation and Manufacturing Act (AIM) of 2020 provides the Environmental Protection Agency (EPA) to direct phase down production of HFC's to 15% in a stepwise manner by 2037 through allowance allocation and trading program. The result is a quota on the manufacture and importation of new HFC's, i.e., an application-specific allowance for the production or importation of any specific HFC such as R-32 or R-454B. However, recycled or reclaimed materials, since they already exist, do not fall under the aegis of the allowance application and trading program. This allows the production of refrigerants free from the restrictions set by the EPA as long as recycled materials are used.

The utilization of recycled or reclaimed HFCs also avoids the anti-dumping restrictions set by the International Trade Commission (ITC). The anti-dumping restrictions include HFCs imported from the People's Republic of China and Mexico. These restrictions cover certain blended HFCs (R-404A, R-407A, R407C, R-410A, and R-507A/R-507) and certain single component HFCs (R-32, R-125, and R-143a). Recycled and reclaimed materials, since they are already in the United States, are free from the antidumping restrictions.

Moreover, recycled or reclaimed materials are low cost compared to virgin manufactured or imported HFCs. This, combined with freedom for allowances and import restrictions, produce a clear economic advantage for the refrigerant of the disclosure.

Another issue for refrigerants is flammability. The most well-established classification for this is the ASHRAE classification. Refrigerants such as R-410A, R-407A and R-404A are class 1 in their flammability, so do not show flame propagation when tested at 100° C. and 101.3 kPa in air. Class 2 refrigerants are those with flammability lower than 0.10 kg/$m^3$ at 100° C. and 101.3 kPa and a heat of combustion of less than 19 kJ/kg. Class 3 refrigerants have flammability over this boundary and this includes many hydrocarbons.

Lubricants

Optionally, lubricants can be added to the formulations of the disclosure. The lubricants can be mineral oil, alkylbenzene oil, polyalkalene glycols (PAGs) or polyol ester (POE).

In another embodiment, the POE can be a synthetic POE compatible for use in refrigeration and air-conditioning compressors using HFC refrigerants, as well as for original equipment manufacturing (OEM) retrofitting operations. The POE forms a single clear phase, i.e., is miscible with the formulations of the disclosure. Miscibility lowers the viscosity of the lubricant carried through the system, so that the lubricant can more efficiently return to the compressor. In contrast, existing mineral oil lubricants are not miscible with HFCs. The composition of the present disclosure is compatible with all types of compressors, including reciprocating and rotary in residential air conditioning, and centrifugal, reciprocating and scroll in industrial and commercial refrigeration and air conditioning.

The POE of the present disclosure can be obtained by introducing neopentyl polyol material, aliphatic monocarboxylic acid material and a catalytic quantity of acid catalyst material into a reaction zone, whereby a reaction mixture is formed, the neopentyl polyol material being at least one neopentyl polyol represented by the structural formula:

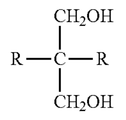

in which each R is independently selected from $—CH_3$, $—C_2H_5$ and $—CH_2OH$. The aliphatic monocarboxylic acid material is at least one aliphatic hydrocarbon monocarboxylic acid, and the acid catalyst material is at least one acid esterification catalyst, wherein the initial concentration of the aliphatic monocarboxylic acid material in the reaction mixture is such as to provide an initial mole ratio of carboxyl groups to hydroxyl groups in the reaction mixture of from about 0.25:1 to about 0.5:1, and, while the reaction mixture is established and maintained at about 338-392° F. (170-200° C.), aliphatic monocarboxylic acid vapor and water vapor are withdrawn from the reaction zone.

Another approach would be to produce a poly(neopentyl polyol) ester composition by (i) reacting a neopentyl polyol having the formula:

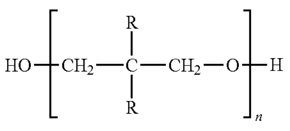

where each R is independently selected from $CH_3$, $C_2H_5$ and $CH_2OH$ and n is a number from 1 to 4, with at least one monocarboxylic acid having 2 to 15 carbon atoms in the presence of an acid catalyst and at an initial mole ratio of carboxyl groups to hydroxyl groups of greater than 0.5:1 to 0.95:1 to form a partially esterified poly(neopentyl polyol) composition; and (ii) reacting the partially esterified poly(neopentyl polyol) composition produced in (i) with additional monocarboxylic acid having 2 to 15 Carbon atoms to form a final poly(neopentyl polyol) ester composition.

The properties of the POE of the present disclosure can be in the viscosity range of about 20 to 68 cSt at 40° C. (104° F.) and about 3 to 7 cSt at 100° C. (212° F.). The viscosity index should be in the range of about 100 to 130. The pour point should be in the range of about −40 to −50° C. (−40 to −58° F.). The density at 20° C. (68° F.) should be in the range of about 0.97 to 0.98 g/ml. The flash point should be in the range of about 240 to 270° C. (about 464 to 518° F.). The acid value should be less than about 0.05 mg KOH/g.

The disclosure is not restricted to POE lubricant. Other lubricants can include mineral or hydrocarbon oil, alkylbenzene oil, white or paraffinic oil and mixtures thereof. The amount of lubricating oil is an amount effective in providing acceptable lubrication to the compressor parts for its longevity. An effective amount of these conventional lubricating oils is the amount recommended by the equipment manufacturer. Typically, the conventional lubricating oil is present in an amount from about 1 to about 60 wt %. The present disclosure has unexpectedly found the amount of POE to be less than about 1 wt %, as little as about 0.67 wt %, with even 0.4 wt % giving excellent lubrication. The range in which POE can be present can be from about 0.1 to about 5 wt %.

Polyalkalene glycols (PAGs) alone or mixed with other lubricants are highly effective in refrigerant applications, where operating temperatures can go as low as −40° F. They are the only major class of synthetic lubricants that are water soluble. PAGs can be mixed with polyol ester for compressor applications. PAGs can be polyethylene glycol, polypropylene glycol, etc. Mixtures of different PAGs can also be used.

PAGs are synthesized using three key oxides: ethylene oxide, propylene oxide, and butylene oxide. The polymerization process can be tailored to produce PAGs with specific properties, such as viscosity and solubility, by controlling the ratio and sequence of the oxides. or instance, alternating copolymerization of ethylene oxide and propylene oxide produces a random copolymer PAG, while block copolymerization results in a block copolymer PAG. These two types of PAGs exhibit different properties, such as solubility in water and hydrocarbon fluids, which makes them suitable for various applications. Polyethylene glycols ($C_{2n}H_{4n+2}O_{n+1}$), known as PEGs, are designated by their molecular weights. For example PEG 400 has as mean molecular weight of 400. Other available PEGS include PEG 3350, PEG 4000 and PEG 8000.

An effective amount of these lubricating oils is the amount recommended by the equipment manufacturer. Typically, the conventional lubricating oil is present in an amount from about 1 to about 60 wt %. The present disclosure has unexpectedly found the amount of POE to be less than about 1 wt %, as little as about 0.67 wt %, with even 0.4 wt % giving excellent lubrication. The range in which POE can be present can be from about 0.1 to about 5 wt %.

Additives

The compositions of the disclosure may also contain one or more additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, UV dyes, sealants and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed about 8 wt %, or more preferably do not exceed about 5 wt %, of the total composition.

An effective amount of the foregoing additive types is generally in the range from about 0.01 to 5 wt % for the antioxidant component, about 0.01 to 5 wt % for the corrosion inhibitor component, from about 0.001 to 0.5 wt % for the metal deactivator component, from about 0.5 to 5 wt % for the lubricity additives, from about 0.01 to 2 wt % for each of the viscosity index enhancers and pour and/or floc point depressants, from about 0.1 to 5 wt % for each of the detergents and dispersants, from about 0.001 to 0.1 wt % for antifoam agents, and from about 0.1-2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of oxidation resistance and thermal stability enhancers suitable for use in the present disclosure include, for example: diphenyl-, dinaphthyl-, and phenylnaphthyl-amines, in which the phenyl and naphthyl groups can be substituted, e.g., N,N'-diphenyl phenylenediamine, p-octyldiphenylamine, p,p-dioctyldiphenylamine, N-phenyl-1-naphthylamine, N-phenyl-2-naphthylamine, N-(p-dodecyl) phenyl-2-naphthylamine, di-1-naphthylamine, and di-2-naphthylamine; phenothiazines such as N-alkylphenothiazines; imino(bisbenzyl); hindered phenols such as 6-(t-butyl) phenol, 2,6-di-(t-butyl) phenol, 4-methyl-2,6-di-(t-butyl) phenol, 4,4'-methylenebis(2,6-di-{t-butyl}phenol); combinations of two or more thereof, and the like.

Examples of cuprous metal deactivators suitable for use in the present disclosure include: imidazole, benzimidazole, 2-mercaptobenzothiazole, 2,5-dimercaptothiadiazole, salicylidine-propylenediamine, pyrazole, benzotriazole, tolutriazole, 2-methylbenzimidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan mono-oleate, lead naphthenate, dodecenylsuccinic acid and its partial esters and amides, and 4-nonylphenoxy acetic acid; primary, secondary, and tertiary aliphatic and cycloaliphatic amines and amine salts of organic and inorganic acids, e.g., oil-soluble alkyl ammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index enhancers include polyacrylates, polymethacrylates, copolymers of vinyl pyrrolidone, as well as, acrylates, methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include poly butenyl succinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable antifoam agents include silicone polymers and acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organophosphorus derivatives including amine phosphates, alkyl acid phosphates, dialkyl phosphates, anime dithiophosphates, trialkyl and triaryl phosphorothioates, trialkyl and triaryl phosphines, and dialkylphosphites, e.g., amine salts of phosphoric acid monoethyl ester, amine salts of dinonylnaphthalene sulfonate, triphenyl phosphate, trinaphthyl phosphate, diphenyl cresyl and cresyl diphenyl phosphates, naphthyl diphenyl phosphate, triphenyl phosphorothionate; dithiocarbamates, such as an antimony dialkyl dithiocarbamate; chlorinated and/or fluorinated hydrocarbons, and xanthates.

Fluorescent dyes may be added to the refrigerant mixture in order to detect leaks. One preferred leak detection or dye additive is a fluorescent, alkyl substituted perylene dye compound dissolved in an oil which is the same as the system lubricating oil, or which is otherwise compatible with the refrigerant and oil. The dye may be soluble in polyhalogenated hydrocarbon refrigerants and fluoresces a brilliant yellow-green under illumination by long wave ultraviolet light. In an automobile air conditioner system that has a fully-charged capacity of thirty-three ounces of R-134a refrigerant and seven ounces of lubricating oil, an amount of about 0.014 ounces dye additive is effective to locate leaks without adversely affecting the operation of the system.

In an embodiment, the dye is a fluorescent dye which is a solid compound or composition soluble in both the refrigerant and refrigeration or system lubricant. The dyes could be naphthoxanthene, perylene and naphthalene compounds, such as:

naphtho{3,2,1-kl}xanthene-2,8-dialkyl,
naphtho{3,2,1-kl}xanthene-2,8-dimethyl
3,9-perylene dialkyl acetate,
3,9-perylene dimethyl acetate,
4-alkylamino-n-alkyl-naphthalimide,
4-alkylamino-n-methyl-naphthalimide, and
dinaphtho(1,2,3-cd; 1'2'3-lm)perylene-9,18-dione, alkyl derivatives.

Dye concentrates can be used which includes a lubricant and at least about 3 weight percent of a leak detection dye, wherein the dye concentrate is a suspension or a semi-solid material, the dye concentrate has a viscosity of at least 10 cP at room temperature, the leak detection dye includes a naphthalimide, a perylene, a thioxanthene, a coumarin, or a fluorescein, and the leak detection dye includes a plurality of particles in which greater than 60 percent of the particles have a particle size of less than 40 microns.

Similar to the liquid dyes, the fluorescent solid dye must be stable at operating temperatures of the A/C or refrigeration system, and should not change the properties of the refrigerant or the system lubricant or adversely affect components and parts of the system.

Sealants may also be added to the refrigerant mixture in order to seal leaks of refrigerant. Leaks allow refrigerants and other working fluids to escape into the atmosphere, contaminating the environment and decreasing the efficiency and cooling capacity of the unit. If large amounts of cooling working fluids such as refrigerants escape, the system may overheat and the service life of the unit will thereby be shortened. Further, the unit may suffer mechanical failure from the loss of the working fluid. In general, leaks in heating and cooling systems also decrease the heat transfer efficiency of these systems.

One example of a sealant is a composition of about 60% by volume of vinyltrimethoxysilane, about 30% by volume of n-beta(aminoethyl)-gamma-aminopropyltrimethoxysilane; and about 10% by volume of methyltrimethoxysilane, a water scavenger. The methyltriethoxysilane is a water scavenger and the vinyl trimethylsilane is a metal bonding material in which the n-beta-(aminoethyl)-gamma-aminopropyltrimethoxysilane is for cross linking.

An organosilane or components of the sealant mixture may include components that can be represented as $(R_1)(R_2)Si(R_3)(R_4)$ where, $R_1$ is an alkyl radical of 1-4 carbon atoms or vinyl or —OH, $R_2$ is $R_1$ or —$OR_1$ or —$NH(R_1)$ or —$N(R_1)_2$ or —$R_1NHR_1NH_2$, $R_3$ is $R_1$ or —$OR_1$ or —$NH(R_1)$ or —$N(R_1)_2$ or —$R_1NHR_1NH_2$, and $R_4$ is $R_1$ or —$OR_1$ or —$NH(R_1)$ or —$N(R_1)_2$ or —$R_1NHR_1NH_2$.

A component of the sealant mixture may include components that can be represented as $(R_5)(R_6)(R_7)Si—O—Si(R_5)(R_6)(R_7)$ $R_5$, $R_6$ or $R_7$ are each any one of $R_1$, $R_2$, $R_3$ or $R_4$ where, $R_1$ is an alkyl radical of 1-4 carbon atoms or vinyl or —OH, $R_2$ is $R_1$ or —$OR_1$ or —$NH(R_1)$ or —$N(R_1)_2$ or —$R_1NHR_1NH_2$, $R_3$ is $R_1$ or —$OR_1$ or —$NH(R_1)$ or —$N(R_1)_2$ or —$R_1NH$ $R_1NH_2$, and $R_4$ is $R_1$ or —$OR_1$ or —$NH(R_1)$ or —$N(R_1)\cdot_2$ or —$R_1NHRR_1NH_2$.

Other components which can be included are oligomers of the monomeric silanes described. One such example are the siloxanes: $(R_5)(R_6)(R_7)Si—O—Si(R_5)(R_6)(R_7)$ Where $R_5$, $R_6$ or $R_7$ may be $R_1$, $R_2$, $R_3$ or $R_4$.

The sealant mixture may also include a lubricant miscible with the organosilane and refrigerant for use in the system. The miscible mixture may include a lubricant selected from one or more of a polyol ester, polyalkylene glycol, mineral oil, polyalphaolefin and alkylbenzene. The miscible mixture may include a lubricant further formed from additives to enhance and refresh the performance of the lubricant in the compressor.

The organosilane is chosen with several criteria in mind. The organosilane is miscible in the lubricant fluid; it is typically a monomer, but may contain oligomers capable of forming a solid polymer with itself or other chosen organosilanes in the presence of moisture under the conditions of the particular application. The reaction rate of the organosilane or mixture of organosilanes is sufficient to form an effective seal at the site of the leak. The polymeric seal is chosen to be sufficiently strong to maintain an effective barrier to prevent further leakage of refrigerant from the system. Also, the organosilanes are chosen to be stable in the absence of moisture, be non-corrosive and otherwise inactive to the components of the system and be generally environmentally acceptable. Further, the nature and quantity injected of the organosilanes are chosen, to the extent that it would interfere with the refrigerant and/or lubricant, so that such interference remains consistent with the normal operation of the refrigerant fluid e.g. vaporization and liquefaction characteristics.

An effective amount of the foregoing additive types is generally in the range from about 0.01 to about 5 wt % for the antioxidant component, about 0.01 to about 5 wt % for the corrosion inhibitor component, from about 0.001 to about 0.5 wt % for the metal deactivator component, from about 0.5 to about 5 wt % for the lubricity additives, from about 0.01 to about 2 wt % for each of the viscosity index enhancers and pour and/or floc point depressants, from about 0.1 to about 5 wt % for each of the detergents and dispersants, from about 0.001 to about 0.1 wt % for antifoam agents, and from about 0.1 to about 2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. As used herein, the term "effective amount" means the amount of each component which upon combination with the other component or components, results in the formation of the present compositions.

Many of the aforementioned additives are multifunctional. For example, certain additives may impart both anti-wear and extreme pressure resistance properties, or function both as a metal deactivator and a corrosion inhibitor. Cumulatively, all additives preferably do not exceed about 8% by weight, or more preferably do not exceed about 5% by weight, of the total composition.

Government Mandates and Refrigerant Reduction

FIGS. 9 and 9A are a reclamation summary of data by the U.S. EPA for reclamation data of ODS (ozone-depleting substances) as well as HFCs. In addition, you can see the category of the growing quantities of HFCs that are classified as "mixed". This is a growing environmental category with no known uses. In looking at all of the data, a few thoughts can be clearly seen:

Although ODS (R-22) was phased out on the schedule shown in FIG. 10, R-22 is still the largest reclaimed product in the U.S. and based on history, will take many years to completely phase out. R-22 is a single molecule and much easier to reclaim with single plate distillation than complex HFCs.

As shown in FIG. 9A, in 2020, 1,992,632 pounds of R-134a of the total sold into the market were reclaimed.

The most difficult stream that exists is the category of "mixed" refrigerant that as the EPA explains is a combination of ODS (R-22) and various HFC streams that cannot be reprocessed and represents nearly 1 million pounds per year, but it is being stockpiled because of complexity.

From a mass balance perspective, it is clear from all data presented that reclamation of refrigerants is severely lacking with the majority of refrigerants vented back into the atmosphere and contributing to global warming.

The manufacturers of next-generation HFC/HFO blends do not participate in reclaim and focus on selling virgin materials back into the market at lower GWP without lifecycle management of the refrigerants that have already been sold.

Manufacture and Use

The refrigerant composition of the present disclosure can be used as an original OEM refrigerant or as a drop-in replacement for equipment using R-134a.

Figure 12:
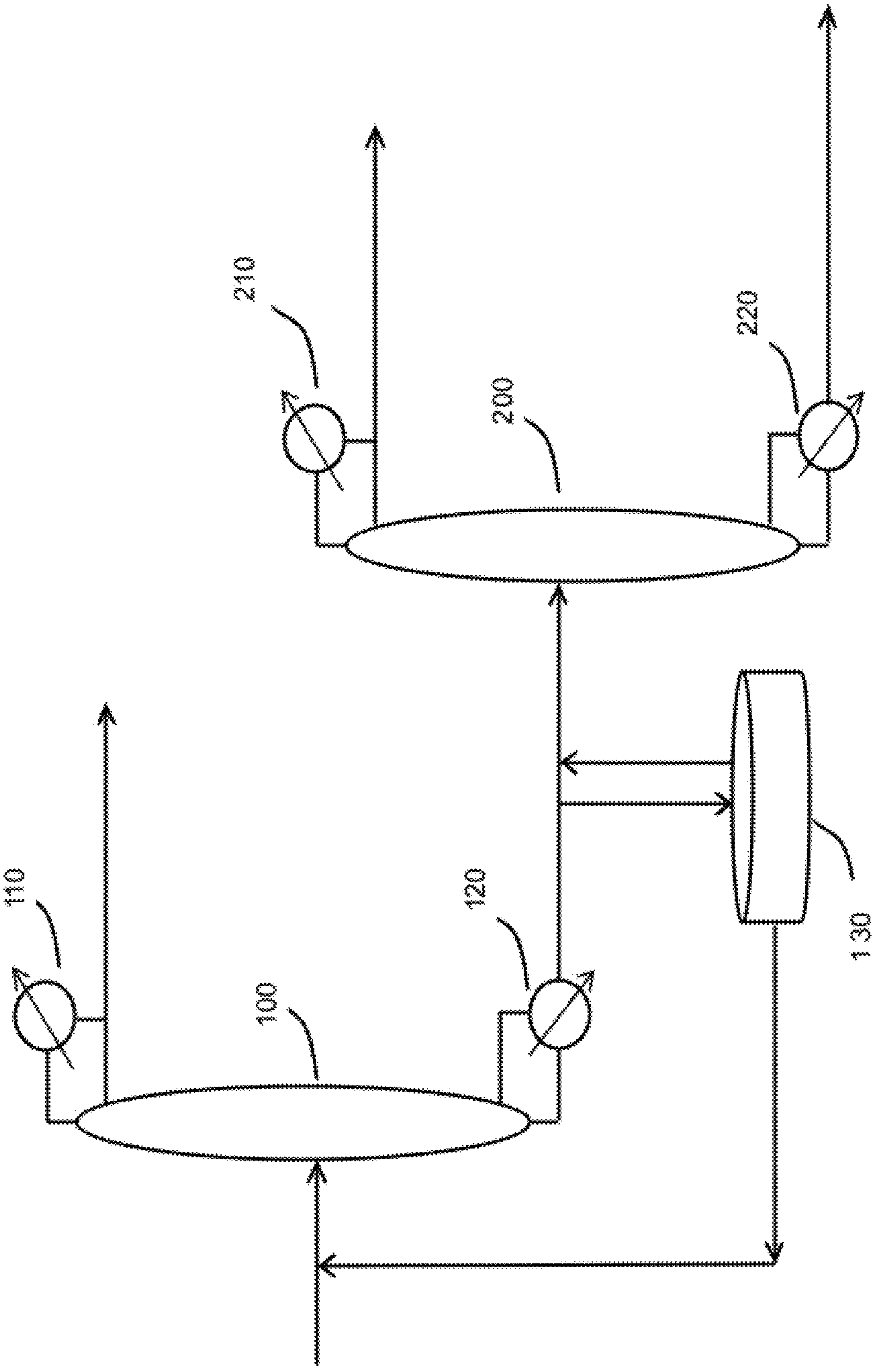
FIG. 12 is a schematic diagram of a distillation apparatus according to an embodiment of the disclosure.

FIG. 12 is a schematic diagram of a distillation apparatus configured to produce components and mixtures that can be utilized as part of the formulation of the disclosure as well as a 0 net GWP replacements for R-32, R-134a, R-454B and R-1234yf. Distillation of the bottom fraction will yield almost pure R-134a.

In FIG. 12, a reclaimed refrigerant mixture is injected into the center of a distillation column 100 equipped with a reflux condenser 110 and a reboiler 120. The column 100 is packed with a material, such as steel Pall rings, configured to provide sufficient theoretical plates. A lighter fraction is distilled or eluted off the top of column 100. A heavier fraction is drained from the bottom of column 100. The heavier fraction is stored in storage tank 130 until it can be re-distilled in distillation column 100.

The heavier fraction can alternately be distilled in an optional second column 200 fitted with a reflux condenser 210 and a reboiler 220. This optional second column 220 provides the possibility to distill the refrigerant mixture in either batch or continuous modes. Not shown in FIG. 12 are temperature sensors, pressure sensors, pressure regulators, temperature regulators, mass flow controllers, process control hardware, process control software and other process details known in the art.

There are numerous streams of reclaimed materials that can be fed into the distillation process according to the disclosure. Many of the reclaimed materials are consolidated by contractors reclaimed in gas stations, HVAC shops and other small businesses where minimal or no efforts are made to isolate the different types of refrigerants including HFCs and ODS materials. Some of the more common reclaimed streams are set forth in Table 5.

TABLE 5

Reclaimed Mixed Materials.

| Components | Feed 0 (wt %) | Feed 1 (wt %) | Feed 2 (wt %) | Feed 3 (wt %) | Feed 4 (wt %) |
|---|---|---|---|---|---|
| R-134a | 15.5 | 1.20 | 2.50 | 7.50 | 11.0 |
| R-125 | 12.5 | 5.00 | 5.00 | 11.00 | 21.5 |
| R-32 | 12.5 | 5.00 | 5.00 | 11.0 | 21.5 |
| R-143a | 6.50 | 1.30 | 0.00 | 5.50 | 13.0 |
| R-22 | 50.0 | 87.5 | 87.5 | 65.0 | 33.0 |
| HC | 3.00 | 0.00 | 0.00 | 0.00 | 0.00 |
| $H_2O$ | $5 \times 10^{-5}$ | $5 \times 10^{-6}$ | $5 \times 10^{-6}$ | $5 \times 10^{-5}$ | $5 \times 10^{-5}$ |
| Total | 100 | 100 | 100 | 100 | 100 |

The following observations can be made regarding the reclaimed mixed materials set forth in Table 5:

R-22 is the most common ODS (ozone depleting substance) because many replacement HFC products have been improperly put into systems "topping off" with HFC blends.

Feed 0 represents the most likely and worst-case scenario for much of the mixed refrigerant in the U.S. market with high content of R143a that has a boiling point very similar to R-22 and is difficult to manage in the fractionation process.

Highly flammable substances like butane, Isobutane and propane have been used as lubricants in a variety of refrigerant applications to replace R-22. Dealing with class 3 flammables is critical.

Mixed materials in many cases contain R-143a (from R-404A) that is mixed at the contractor level, making fractionation very difficult and requiring unique technical solutions in fractionation and forcing the high purity R-32:R-125 mix or other mixtures in order to extract the components.

The distillation column(s) of the disclosure have been designed using ASPEN models and then verified by Koch-Glitsch. ASPEN is a process simulation software package used in industry. Given a process design and an appropriate selection of thermodynamic models, ASPEN uses mathematical models to predict the performance of the process. The process of the disclosure can make the 91:9 material directly off of a single first pass, utilizing waste streams of material that would otherwise be vented, and are being stored around the country or ultimately require $CO_2$ to burn in a rotary kiln.

Example 1—Feed Zero

Feed Zero is fed into the center of the distillation column at a temperature about 140-150° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 6.

TABLE 6

Top and bottom fractions of Feed-0 Case (wt).

| Component | Top Fraction (wt) | Bottom Fraction (wt) |
| --- | --- | --- |
| R-32 | 0.913 | 0.0695 |
| R-125 | 0.085 | 0.128 |
| R-143a | 0.00264 | 0.0693 |
| R-22 | $4.93 \times 10^{-5}$ | 0.535 |
| R-134a | $6.23 \times 10^{-9}$ | 0.166 |
| Oils (hydrocarbons) | $2.11 \times 10^{-15}$ | 0.0321 |
| Water | $1.95 \times 10^{-25}$ | 5.32 x 10−5 |

One of the advantages of the distillation product is the extremely low levels of impurities in the top fraction, especially in regards to oils (hydrocarbons) and water. For example, Feed 0 has $5\times10^{-5}$ wt % water and 3.0 wt % hydrocarbons. The presence of these impurities of the distillate removed from the top of the column reduces the amount of water and hydrocarbons by a magnitude of $10^{-15}$ for oils and $10^{-25}$ for water. Typically, the range for hydrocarbons may vary from $1\times10^{-14}$ to $1\times10^{-16}$ wt % for hydrocarbons and $1\times10^{-24}$ to $1\times10^{-26}$ wt % for water. With a variance of 5%, the level of hydrocarbons is usually $2\times10^{-15}$ wt % and the level of water is $2\times10^{-25}$ wt %.

The level of refrigerants other than R-32 and R-125 in the distillation product is also very low. There is about $3\times10^{-3}$ wt % R-143a, $5\times10^{-5}$ wt % R-22 and $6\times10^{-9}$ wt % R-134a in the distillation product. These quantities of other refrigerants are too small to affect the performance of refrigerants formulated using the top fraction of case 0.

With the system of the disclosure, and considering high volumes of R-143a in the feedstock, a final product that has zero moisture can be incorporated into the formulation of the disclosure or, which can be packaged and sold directly into new equipment as a net zero GWP replacement for R-134a. Likewise, the technology can handle nearly all legacy mixed streams, and can replace nearly all past refrigerants into new equipment. In Table 6, the mixture eluted from the top of the column and achieves >99.5% purity, with no moisture content. The bottom fraction can be subjected to further distillation steps to obtain nearly pure R-22 that can be used in the formulations of the disclosure or in R-22 compatible equipment with a net GWP of zero.

Example 2—Feed 1

Feed 1 is fed into the center of the distillation column at a temperature of about 145-155° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 7.

TABLE 7

Top and bottom fractions of Feed-1 Case (wt).

| Component | Top Fraction (wt) | Bottom Fraction (wt) |
| --- | --- | --- |
| R-32 | 0.653 | 0.000392 |
| R-125 | 0.336 | 0.0265 |
| R-143a | 0.00726 | 0.0135 |
| R-22 | 0.00375 | 0.947 |
| R-134a | $2.30 \times 10^{-8}$ | 0.0130 |
| Oils (hydrocarbons) | 0 | 0 |
| Water | $9.029 \times 10^{-21}$ | $5.41 \times 10^{-6}$ |

In this case, the top fraction yields a ratio of about 65:35 R-32:R-125. Further distillation steps can further isolate components, including an 0.9998 fraction of R-22 that can be used in formulations of the disclosure or in R-22 compatible equipment with a net GWP of zero. This purified fraction can also be used in formulations to replace R-32.

The Feed-1 Case also shows a low level of impurities. There is 0 wt % hydrocarbons in both the top and bottom fractions. The top fraction has about $1\times10^{-20}$ wt % water, with the bulk of the water in the feed stream remains in the bottom fraction at about $5\times10^{-6}$ wt %.

A second distillation of the bottom fraction will provide an almost pure stream of R-134a from the bottom of the second column or, alternatively, the bottom fraction being sent back to the first column. Almost pure R-134a can be taken off the bottom of the column, as can be seen in Table 8.

TABLE 8

Top and bottom fractions of the second distillation of the Feed-1 Case (wt).

| Component | Feed (wt) | Top Fraction (wt) | Bottom Fraction (wt) |
| --- | --- | --- | --- |
| R-32 | 0.000392 | 0.000397 | $8.63 \times 10^{-11}$ |
| R-125 | 0.0265 | 0.0268 | $1.40 \times 10^{-7}$ |
| R-143A | 0.0135 | 0.0137 | $8.84 \times 10^{-7}$ |
| R-22 | 0.947 | 0.959 | 0.030 |
| R-134a | 0.0130 | $3.57 \times 10^{-5}$ | 0.960 |
| Oils | 0 | 0 | 0 |
| Water | $5.41 \times 10^{-6}$ | $1.11 \times 10^{-22}$ | $4.05 \times 10^{-4}$ |

Here, the amount of water in the top fraction is smaller than that of the to the top fraction in the first distillation, with a magnitude of $1\times10^{-22}$ wt %.

Example 3—Feed 2

Feed 2 is fed into the center of the distillation column at a temperature of about 145-155° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 9.

TABLE 9

Top and bottom fractions of Feed-2 Case (wt).

| Component | Top Fraction (wt) | Bottom Fraction (wt) |
| --- | --- | --- |
| R-32 | 0.654 | 0.000385 |
| R-125 | 0.343 | 0.0259 |
| R-143a | 0 | 0 |
| R-22 | 0.00335 | 0.947 |
| R-134a | $4.15 \times 10^{-8}$ | 0.0271 |

TABLE 9-continued

| Top and bottom fractions of Feed-2 Case (wt). | | |
|---|---|---|
| Component | Top Fraction (wt) | Bottom Fraction (wt) |
| Oils (hydrocarbons) | 0 | 0 |
| Water | $6.71 \times 10^{-21}$ | $5.41 \times 10^{-6}$ |

In this case, the top fraction yields a ratio of about 7:3 R-32:R-125, which can be incorporated into formulations of the disclosure but is not suitable as a direct replacement for R-134a. Further distillation steps can further isolate components, including purified fractions of R-22 and R-134a. Both top and bottom fractions have 0 wt % hydrocarbons, with about $7\times10^{-21}$ wt % water in the top fraction and about $5\times10^{-6}$ wt % water for the bottom fraction.

A second distillation of the bottom fraction will provide an almost pure stream of R-134a from the bottom of the second column or, alternatively, the bottom fraction being sent back to the first column. Almost pure R-134a can be taken off the bottom of the column, as can be seen in Table 10.

TABLE 10

| Top and bottom fractions of the second distillation of the Feed-2 Case (wt). | | | |
|---|---|---|---|
| Component | Feed (wt) | Top Fraction (wt) | Bottom Fraction (wt) |
| R-32 | 0.000385 | 0.000396 | $5.24 \times 10^{-11}$ |
| R-125 | 0.0259 | 0.0266 | $9.71 \times 10^{-8}$ |
| R-143a | 0 | 0 | 0 |
| R-22 | 0.947 | 0.97285 | 0.0136 |
| R-134a | 0.0271 | 0.000105 | 0.986 |
| Oils | 0 | 0 | 0 |
| Water | $5.41 \times 10^{-6}$ | $1.68 \times 10^{-22}$ | $1.98 \times 10^{-4}$ |

The top and bottom fractions both have 0 wt % hydrocarbons with about $2\times10^{-22}$ wt % water in the top fraction and about $2\times10^{-4}$ wt % water in the bottom fraction.

Example 4—Feed 3

Feed 3 is fed into the center of the distillation column at a temperature about 140-150° F. and a pressure of about 400-420 psia. The top fraction is taken off at a temperature of 95-105° F. and about 370-380 psia. The bottom fraction is taken off at a temperature of about 135-145° F. and a pressure of about 375-385 psia. The composition of the top and bottom fractions is shown in Table 11.

TABLE 11

| Top and bottom fractions of Feed-3 Case (wt). | | |
|---|---|---|
| Component | Top Fraction (wt) | Bottom Fraction (wt) |
| R-32 | 0.910 | 0.0540 |
| R-125 | 0.087 | 0.1116 |
| R-143a | 0.00248 | 0.0587 |
| R-22 | $6.95 \times 10^{-5}$ | 0.695 |
| R-134a | $3.26 \times 10^{-9}$ | 0.0802 |
| Oils | 0 | 0 |
| Water | $2.28 \times 10^{-25}$ | $5.35 \times 10^{-5}$ |

In this case there are 0 wt % hydrocarbons in both the top and bottom fractions. The top fraction has about $3\times10^{-25}$ wt % water, and the bottom fraction has about $5\times10^{-5}$ wt % water.

With the system of the disclosure, a final product eluting from the top of the column has zero moisture and can be directly incorporated into the formulations of the disclosure or can be packaged and sold directly into new equipment as a replacement for R-32. Table 9 showing the 91:9 formulation eluted from the top of the column achieves >99.5% purity, with effectively no moisture content. The bottom fraction can be subjected to further distillation steps to obtain nearly pure R-22 and R-134a that can be used in R-22 and R-134a compatible equipment with a net GWP of zero.

A second distillation of the bottom fraction will provide an almost pure stream of R-134a from the bottom of the second column or, alternatively, the bottom fraction being sent back to the first column. Almost pure R-134a can be taken off the bottom of the column, as can be seen in Table 12.

TABLE 12

| Top and bottom fractions of the second distillation of the Feed-3 Case (wt). | | | |
|---|---|---|---|
| Component | Feed (wt) | Top Fraction (wt) | Bottom Fraction (wt) |
| R-32 | 0.0540 | 0.0587 | $4.29 \times 10^{-9}$ |
| R-125 | 0.1116 | 0.121 | $2.86 \times 10^{-7}$ |
| R-143a | 0.0587 | 0.064 | $1.69 \times 10^{-6}$ |
| R-22 | 0.695 | 0.756 | 0.0059 |
| R-134a | 0.0802 | 0.00018 | 0.993 |
| Oils (hydrocarbons | 0 | 0 | 0 |
| Water | $5.35 \times 10^{-5}$ | $2.56 \times 10^{-21}$ | $6.64 \times 10^{-4}$ |

In this case there are no hydrocarbons present. The water in the feed is partitioned so that about $3\times10^{-21}$ wt % is present in the top fraction (effectively no water) and about $7\times10^{-4}$ wt % present in the bottom fraction.

Example 5—Feed 4

Feed 4 is fed into the center of the distillation column at a temperature of about 130-140° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 13.

TABLE 13

| Top and bottom fractions of Feed-4 Case (wt %). | | |
|---|---|---|
| Component | Top Fraction (wt) | Bottom Fraction (wt) |
| R-32 | 0.498 | 0.000226 |
| R-125 | 0.422 | 0.0575 |
| R-143a | 0.0761 | 0.171 |
| R-22 | 0.00381 | 0.578 |
| R-134a | $4.28 \times 10^{-7}$ | 0.194 |
| Oils (hydrocarbons) | 0 | 0 |
| Water | $1.32 \times 10^{-18}$ | $8.80 \times 10^{-6}$ |

In this case, the top fraction yields a ratio of about 5:4 R-32:R-125, which can be incorporated into the formulations of the disclosure. There is 0 wt % hydrocarbons present. The water is partitioned so that about $1\times10^{-18}$ wt % is present in the top fraction (effectively no water) and about $9\times10^{-6}$ wt % present in the bottom fraction. Further distillation steps can further isolate components, including purified fractions of R-22 and R-134a.

Also, the 91:9 R-32:R-125 material is suitable as a component of the R-134a drop in formulation of the disclosure as well as a drop-in replacement for R-32. Additional materials can be added to the formulations containing the 91:9 mixture or to the 91:9 mixture unmixed with other refrigerants, including but not restricted to lubricants, UV dyes and sealants as discussed above.

A second distillation of the bottom fraction will provide an almost pure stream of R-134a from the bottom of the second column or, alternatively, the bottom fraction being sent back to the first column. Almost pure R-134a can be taken off the bottom of the column, as can be seen in Table 14.

TABLE 14

Top and bottom fractions of the second distillation of the Feed-4 Case (wt).

| Component | Feed (wt) | Top Fraction (wt) | Bottom Fraction (wt) |
|---|---|---|---|
| R-32 | 0.000226 | 0.00028 | $3.43 \times 10^{-11}$ |
| R-125 | 0.0575 | 0.072 | $2.72 \times 10^{-7}$ |
| R-143a | 0.171 | 0.212 | $9.35 \times 10^{-6}$ |
| R-22 | 0.578 | 0.716 | 0.0103 |
| R-134a | 0.194 | 0.00012 | 0.990 |
| Oils | 0 | 0 | 0 |
| Water | $8.80 \times 10^{-6}$ | $9.56 \times 10^{-22}$ | $4.50 \times 10^{-5}$ |

Combining components of the first and second distillations with R-1234ze(E) will yield a drop-in replacement for R-134a or can be used as an original refrigerant for OEM applications. The combinations of streams are set forth below:

Bottom of C2 (Feed 1)+Top of C1 (Feed 0)+1234ze(E)
Bottom of C2 (Feed 2)+Top of C1 (Feed 3)+1234ze(E)
Bottom of C2 (Feed 3)+Top of C1 (Feed 3)+1234ze(E)
Bottom of C2 (Feed 4)+Top of C1 (Feeds 1 and 3)+1234ze(E).

In this case there are no hydrocarbons present. The water in the feed is partitioned so that there is about $1\times10^{-21}$ wt % present in the top fraction (effectively no water) and about $5\times10^{-5}$ wt % present in the bottom fraction.

Great advantages are obtained by the use of recycled materials. The Environmental Protection Agency (EPA) requires that refrigerants must be reclaimed for recycling. However, the result is that mixed refrigerant steams are created which are inimical to recycling due to their properties which inhibit their reuse in refrigeration equipment. There is estimated to be about 100 million pounds of these mixed material in the United States which, if not recycled, must eventually be incinerated at great expense and environmental cost.

The situation is further complicated by production/import quotas set by the EPA for the production or importation of newly manufactured refrigerants, which add further to the net GWP. In contrast, the net GWP for the recycled refrigerant itself is 0. That is, reclaim refrigerant does not turn back into a production allowance (GWP). GWP is assigned upon building the molecule and not via reclaim. The GWP is already accounted for and thus the applicant can gain carbon credits for this material.

Additionally, the International Trade Commission (ITC) sets quotas on the importation of refrigerants from nations such as China and Mexico as part of antidumping restrictions.

There is thus a great demand for refrigerants, but the production/importation of new refrigerants (with their additional GWP burden) is problematic and highly restricted.

The reclaimed replacement formulations for R-134a of the disclosure help address the long felt but unsolved need of addressing global warming.

In practice, charging the air conditioner or refrigerator with the R-134a replacement is performed using a charging cylinder designed to meter out a desired amount of a specific refrigerant by weight. Compensation for temperature variations is accomplished by reading the pressure on the gauge of the cylinder and dialing, using a calibrated chart, to the corresponding pressure reading for the refrigerant being used. When charging a refrigeration or air conditioning system with refrigerant, often the pressure in the system reaches a point where it is equal to the pressure in the charging cylinder from which the system is being charged. In order to get more refrigerant into the system to complete the charge, heat must be applied to the cylinder. In an exemplary embodiment, a standard 25 or 30 lb cylinder can be used, which is charged under pressure with the refrigerant composition of the current disclosure. This cylinder is fitted with an outlet compatible with R-134a. The outlet is connected to a recharging manifold of the apparatus to be charged.

Accordingly, the disclosure has shown that a drop-in replacement for R-134a unexpectedly produces a dramatic drop in net GWP to zero while not sacrificing performance in air conditioning or refrigeration systems. Every pound of R-134a, as well as the 91:9 blend of R-32 and R-125, and other solvents included in these disclosed formulations, serves as a direct substitute for R-134a & R-1234yf. This substitution is significant as it prevents the production of an equivalent amount of R-134a, thereby eliminating the associated Global Warming Potential (GWP) of 1,430 that comes with newly manufactured R-134a. The R-1234ze(E) component of the disclosure also has a GWP of 1 to 0. The result is to reduce or prevent anthropogenic further emissions of greenhouse gases, in the framework of the Kyoto Protocol and the Paris Agreement. The technology of the disclosure will thus assist in the decarbonization of the atmosphere.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A refrigerant composition, comprising:

about 56-60 wt % 1,1,1,2-tetrafluoroethane;

about 0.1-1 wt % pentafluoroethane;

about 3-7 wt % difluoromethane; and about 35-38 wt % 1,3,3,3-tetrafluoropropene, wherein the composition is zeotropic, the difluoromethane and the 1,1,1,2-tetrafluoroethane are a distilled fraction of reclaimed refrigerants, with the distilled fraction containing about $2\times10^{-15}$ wt % hydrocarbons and about $2\times10^{-25}$ wt % water, and the refrigerant is a drop-in replacement for 2,3,3,3-tetrafluoropropene.

2. The refrigerant composition of claim 1, further comprising about 0.1-5 wt % CO2.

3. The refrigerant composition of claim 1, comprising:

about 58 wt % 1,1,1,2-tetrafluoroethane;

about 0.5 wt % pentafluoroethane;

about 5 wt % difluoromethane; and about 36.5 wt % 1,3,3,3-tetrafluoropropene.

4. The refrigerant composition of claim 1, wherein the refrigerant composition has a theoretical boiling point of about-13° F.

5. The refrigerant composition of claim 1, wherein the refrigerant composition has a liquid phase pressure of about 95 psia at 70° F. and a vapor phase pressure of about 85 psia at 70° F.

6. The refrigerant composition of claim 1, wherein the refrigerant composition has a global warming potential of less than 1.

7. The refrigerant composition of claim 1, wherein the refrigerant composition has a liquid phase density of about 1.19 $g/cm^3$ at 70° F. and a vapor phase density of about 0.028 $g/cm^3$ at 70° F.

8. The refrigerant composition of claim 1, wherein the refrigerant composition has a liquid phase enthalpy of about 0.23 kJ/g at 70° F.

9. The refrigerant composition of claim 1, wherein the refrigerant composition has a vapor phase enthalpy of about 0.41 kJ/g at 70° F.

10. The refrigerant composition of claim 1, wherein the refrigerant composition has a liquid phase entropy of about $6.1\times10^{-4}$ kJ/gR at 70° F.

11. The refrigerant composition of claim 1, wherein the refrigerant composition has a vapor phase entropy of about $9.5\times10^{-4}$ kJ/gR at 70° F.

12. A refrigerant mixture, comprising:

about 95-99.99 wt % of the refrigerant composition of claim 1; and about 0.01-5 wt % lubricant.

13. The refrigerant mixture of claim 12, wherein the lubricant is selected from the group consisting of mineral oil, alkylbenzene oil, polyalkylene glycol and polyol ester.

14. The refrigerant mixture of claim 12, wherein the lubricant is a polyalkylene glycol or an ester of at least one neopentyl polyol represented by the structural formula:

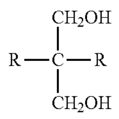

in which each R is independently selected from $CH_3$, $C_2H_5$ or $CH_2OH$.

15. The refrigerant mixture of claim 12, wherein the refrigerant mixture further comprises at least one of an ultraviolet dye or a sealant.

* * * * *